US012570323B2

(12) United States Patent
Baker et al.

(10) Patent No.: US 12,570,323 B2
(45) Date of Patent: Mar. 10, 2026

(54) CROSSWALK HANDLING FOR VEHICLES

(71) Applicant: Zoox, Inc., Foster City, CA (US)

(72) Inventors: Andrew Baker, North Hollywood, CA (US); Clark Michael Davenport, San Bruno, CA (US); Rasmus Fonseca, Boulder Creek, CA (US); Joseph Lorenzetti, Foster City, CA (US); Wentao Zhong, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 181 days.

(21) Appl. No.: 18/233,019

(22) Filed: Aug. 11, 2023

(65) Prior Publication Data

US 2025/0050912 A1     Feb. 13, 2025

(51) Int. Cl.
B60W 60/00          (2020.01)
B60W 50/00          (2006.01)

(52) U.S. Cl.
CPC .... B60W 60/0017 (2020.02); B60W 50/0097 (2013.01); B60W 2520/00 (2013.01); B60W 2552/53 (2020.02); B60W 2554/80 (2020.02)

(58) Field of Classification Search
CPC ......... B60W 60/0017; B60W 50/0097; B60W 2520/00
See application file for complete search history.

(56) References Cited

U.S. PATENT DOCUMENTS

2018/0329418 A1* 11/2018 Baalke ..................... G16Z 99/00
2019/0122037 A1*  4/2019 Russell ................ G05D 1/0214

2019/0213873 A1*  7/2019 Adireddy ............. G08G 1/0116
2021/0004611 A1   1/2021 Garimella et al.
2022/0126864 A1*  4/2022 Moustafa .............. B60W 40/09
2022/0194431 A1*  6/2022 Chu .................. B60W 60/0051
2024/0246479 A1*  7/2024 Barrera .............. B60W 60/001
2024/0359683 A1* 10/2024 Perez Barrera ........ G06V 20/58

FOREIGN PATENT DOCUMENTS

EP          3690860 A1    8/2020
JP        2008176648 A    7/2008
KR       20220146726 A   11/2022

OTHER PUBLICATIONS

Search Report and Written Opinion for International Application No. PCT/US2024/040558, Dated Nov. 13, 2024, 12 pages.

* cited by examiner

*Primary Examiner* — Toya Pettiegrew

(74) *Attorney, Agent, or Firm* — Lee & Hayes, P.C.

(57)                    ABSTRACT

Techniques and methods for crosswalk handling for vehicles. The vehicle may identify a crosswalk and an object associated with the crosswalk in the environment. The vehicle may determine a heatmap based on sensor data and map data. The vehicle may determine a factor associated with the crosswalk relative to one or more of the vehicle and/or object based on the heatmap associated with the crosswalk. The vehicle may determine a cost associated with the crosswalk based on the factor. The vehicle may determine a trajectory for the vehicle to operate in the environment based on the cost associated with the crosswalk and follow the trajectory to travel in the environment.

20 Claims, 21 Drawing Sheets

100

200(1)

200(2)

200(5)

200(6)

600

Object

B1

B2

Crosswalk
604

602 v

Vx

Vx_des

Vx_initial

Sstart

Sfront

S1

S2

Send

Sx

CROSSWALK HANDLING FOR VEHICLES

BACKGROUND

An autonomous vehicle may be equipped with a planning system configured to plan trajectories for the vehicle to navigate in an environment. When operating in the environment, the planning system of the vehicle may need to address various scenarios including junctions, intersections, crosswalks, and objects in the environment. The objects may include static and/or dynamic objects, such as pedestrians, cyclists, other vehicles, etc. Certain planning systems may plan a trajectory for the vehicle across crosswalks, junctions, and/or intersections by identifying the presence of a traffic light or a traffic sign (such as a stop sign). However, relying on traffic control devices alone may lead to unsafe situations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1A:
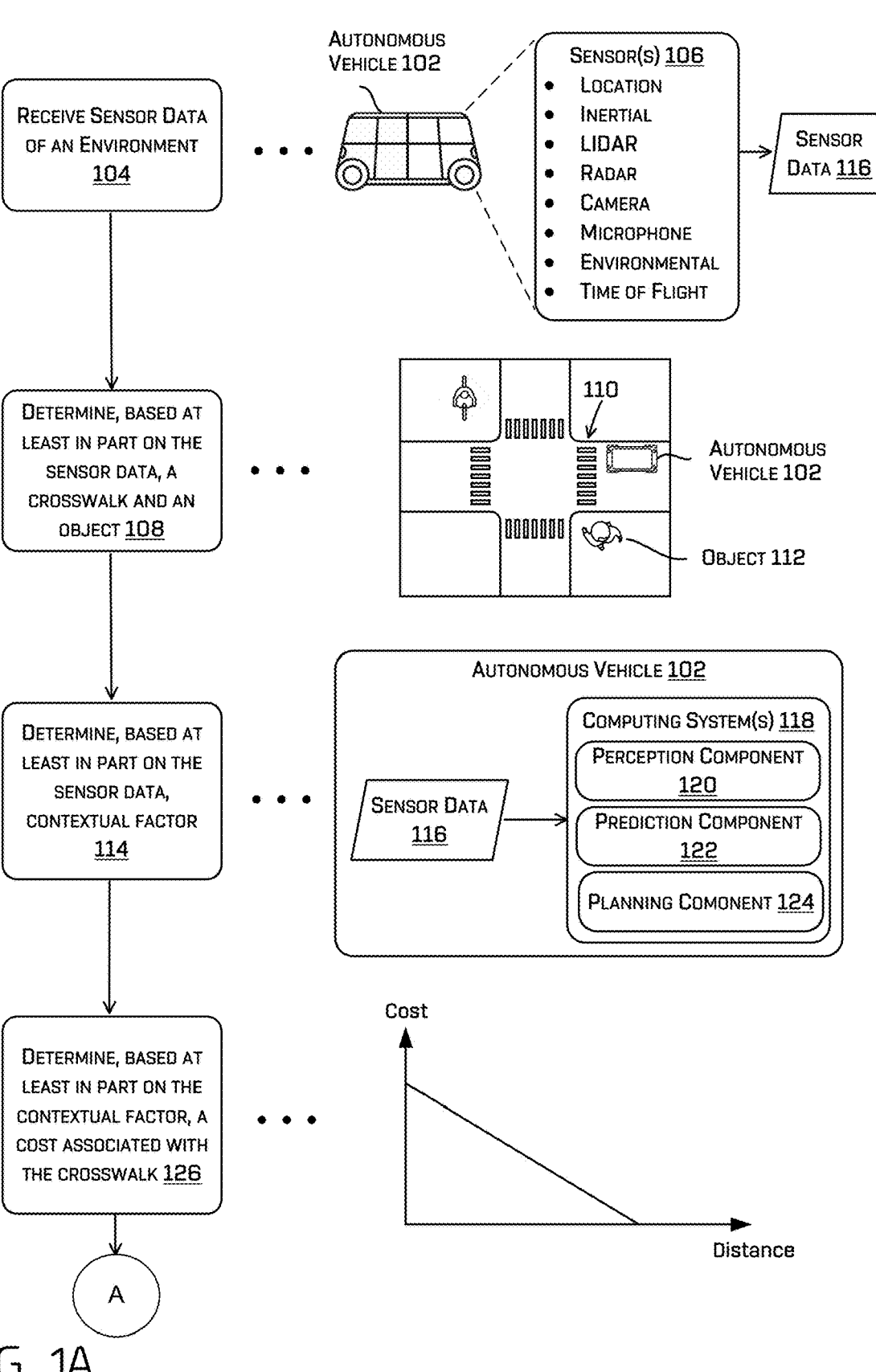
FIG. 1A and FIG. 1B illustrate a pictorial flow diagram of a process for generating a trajectory across a crosswalk for an autonomous vehicle based on a cost associated with the crosswalk in an environment in which the autonomous vehicle is operating.

This disclosure is directed to techniques for controlling vehicles passing through crosswalks associated with objects in an environment, based on costs associated with the crosswalks. As discussed above, a vehicle may be equipped with a planning system configured to plan trajectories for the vehicle in an environment. When navigating in the environment, the vehicle may encounter junctions, intersections, crosswalks, and objects in the environment. The objects may include dynamic objects, such as pedestrians (including wheeled pedestrians, pedestrians with other objects, etc.), cyclists, and other vehicles, etc. Crosswalks can be categorized in various ways. For example, there can be entering crosswalks and exiting crosswalks, crossable crosswalks and non-crossable crosswalks, controlled crosswalks, uncontrolled crosswalks, etc., as explained in more detail below. In some examples, the crosswalk can be marked in the map data. Alternatively, the crosswalk can be unmarked in the map data and can be detected based on the sensor data. The map data can be stored in a storage in the computing system of the vehicle, an online storage, storage on another vehicle, storage of a remote computing system, or the like.

An "entering crosswalk" may refer to the crosswalk that is located on the side where the vehicle is entering the intersection/junction. A vehicle can be considered as entering the intersection/junction when the front axle of the vehicle crosses the beginning of the entering crosswalk. On the other hand, an "exiting crosswalk" may refer to the crosswalk which is located on the side the vehicle is exiting the intersection/junction. Additional details of the entering crosswalk and the exiting crosswalk are described with respect to FIGS. 2A-2H. In some instances, a "far side" of the crosswalk may refer to a part of the crosswalk located on related lanes (e.g., an adjacent lane, an oncoming lane, an opposite lane, or the like). Moreover, a "vehicle side" of the crosswalk may refer to a part of the crosswalk located within the lane in which the vehicle is operating. In some cases, the location of the crosswalk can be determined based on sensor data, map data, or the like.

When the vehicle is approaching a crosswalk, the crosswalk may be in a "crossable state" or a "non-crossable state." A crossable state for the crosswalk may refer to a state in which pedestrians are allowed to cross the road safely and legally through the crosswalk at a moment. For example, a crosswalk can be considered in a crossable state when a pedestrian signal displays a "walk" or a "green man" symbol, when a traffic light is green, when a pedestrian is already in the middle of the crosswalk, in an absence of a traffic light (e.g., no traffic control devices and/or having signage alone), or the like. On the other hand, a non-crossable state for a crosswalk may refer to a state in which it is unsafe or illegal for pedestrians to cross the road through the crosswalk at a moment. For example, a crosswalk can be considered in a non-crossable state when a pedestrian signal displays a red hand or "don't walk" symbol, when a traffic light at the crosswalk is red, when a vehicle is in the middle of crossing the crosswalk, or the like. Additionally or alternatively, there may be other ways to determine that the designated crosswalk is in a non-crossable state. For example, other vehicles are traveling through the crosswalk and there is no gap in-between the traffic flow.

A "controlled" crosswalk may refer to a crosswalk that is associated with traffic signs (e.g., stop lines, stop signs, yield signs, pedestrian crossing signs, etc.) or traffic signals (e.g., traffic lights, pedestrian crossing signals, arrow traffic lights, countdown timer, or the like). In some instances, a controlled crosswalk can be associated with a junction. On the other hand, an "uncontrolled" crosswalk may refer to a crosswalk that is not accompanied by traffic signs or traffic signals. Such an uncontrolled crosswalk can be located in the middle of blocks or roads. Examples of the controlled crosswalk and the uncontrolled crosswalk are given throughout this disclosure, for example, in FIGS. 2A-2H.

A "protected" crosswalk may refer to a crosswalk where the vehicle has the right of way over an object (e.g., a pedestrian, a cyclist, an animal, a wheeled pedestrian, etc.) close to or inside the crosswalk. An "unprotected" crosswalk may refer to a crosswalk where the vehicle does not have the right of way over an object close to or inside the crosswalk.

Examples of the protected crosswalk and the unprotected crosswalk are given throughout this disclosure, for example, in FIGS. 2A-2H. In such cases, vehicles may be required to give priority to pedestrians attempting to cross at those locations.

In some instances, a pedestrian may cross the road at a crosswalk despite not having priority (e.g., crossing an unprotected crosswalk, a crosswalk without traffic lights, a crosswalk unrelated to any junctions, etc.). For example, under some circumstances such as when there is an emergency when the pedestrian misreads the traffic signal, when there are no traffic signs or traffic lights, when there is a gap in the traffic flow, or the like, a pedestrian may cross the road through a such a crosswalk. In such cases, should the vehicle rely on the crosswalk state (or crosswalk classification) alone, the vehicle may raise safety concerns. Therefore, the planning of the vehicle can be improved when a vehicle approaches such a crosswalk through which a pedestrian is going to cross the road, such that the vehicle will slow down, yield, or stop to let the pedestrian cross the road through the crosswalk without leaving the crosswalk.

The vehicle may include an autonomous or semi-autonomous vehicle. A vehicle computing system may be configured to determine costs associated with crosswalks and use the costs in trajectory planning for the vehicle. In some examples, the vehicle computing system may perform trajectory planning by conducting a tree search based on costs, though the disclosure is not intended to be so limiting and the techniques described herein may be employed in other trajectory generation strategies. The tree search may include a decision-making process that uses a tree-like structure to break down a problem into steps and/or tests. The tree search can include nodes and branches, where an individual node may represent a decision to be made regarding which action to take, and each branch may represent the possible outcomes of that node. The top node of the tree is called the root node, and the bottom nodes are called leaf nodes. In some examples, the tree search discussed herein may comprise a tree data structure and/or a search algorithm, such as a Markov decision process (MDP), partially-observable MDP (POMDP), multi-objective MDP (MOMDP), directed acyclic graph (DAG), and/or D*, D*lite, Focused Dynamic A*, A*, LPA*, Dijkstra's algorithm, value iteration (VI), lexicographic value iteration (LVI), and/or the like.

The computing system of the vehicle may perform the tree search to choose a trajectory for the vehicle from a set of candidate trajectories at each time tick to execute based on costs determined for candidate trajectories. Details of trajectory planning using a tree search are discussed in U.S. application Ser. Nos. 16/908,389, 16/889,238, and 16/539, 928, which are herein incorporated by reference in their entirety for all purposes. In some instances, determining a cost associated with a crosswalk may include determining the cost, using a cost function, based on various factors including, but not limited to, the vehicle velocity, the distance of the vehicle to a first boundary of the crosswalk, a distance of the object to a boundary of the crosswalk on the path of the vehicle (e.g., in a current lane in which the vehicle is operating), a distance of the object to a boundary of the crosswalk in a related lane (e.g., an oncoming lane, an adjacent lane, etc.), a classification the object, a moving direction of the object, a velocity of the object, a likelihood of avoiding an object, a likelihood of impacting on an object, conformance to rules of the road, comfort metrics (e.g., a distance to the object, an acceleration and/or jerk associated with the vehicle), progress along a route, the satisfaction of a mission (e.g., parking, delivering/picking up a passenger), etc.

In some cases, a junction/intersection may include more than one crosswalk. The state and/or the cost of a designated crosswalk may change as the vehicle passes through the junction/intersection over time. The operations of the vehicle may include evaluating at discrete timesteps or points along the trajectory of the vehicle in the environment. Such evaluation may include updating, but is not limited to, the location of the crosswalk, the location of the vehicle, the location of the object, the moving direction of the object, the distance of the vehicle to one or more crosswalks, a distance of the object to a boundary of the crosswalk, a distance of the vehicle to the object, a state of the traffic signal, a presence of a traffic sign, etc.

The vehicle may be equipped with one or more sensors that can collect sensor data when the vehicle is traversing the environment. In some examples, the sensor(s) may include cameras, motion detectors, lidar, radar, etc. that are config-ured to collect data. The vehicle computing system may have a perception component configured to use the sensor data to determine perception data such as a presence of an object, an object classification (e.g., a car, a pedestrian, a cyclist, an animal, a building, etc.), a characteristic of the object (e.g., a velocity of the object, an orientation of the object, a pose of the object, a moving direction of the object, an acceleration of the object, a size of the object, etc.), environmental data (e.g., a road, a lane, a crosswalk, a curb, a sidewalk, a traffic light, a traffic sign, etc.), a characteristic of the vehicle (e.g., a vehicle velocity, an orientation of the vehicle, a pose of the vehicle, a moving direction of the vehicle, an acceleration of vehicle, etc.), or the like. The vehicle computing system may include a prediction com-ponent to generate predicted trajectories of objects (e.g., a pedestrian, a cyclist, an animal, a wheeled pedestrian, etc.) in an environment. For example, the prediction component may generate one or more predicted trajectories for objects within a threshold distance from a crosswalk. In some examples, the prediction component may measure a trace of an object and generate a trajectory for the object based on observed and predicted behavior. Details of trajectory pre-diction of objects are discussed in U.S. application Ser. No. 15/833,715, which is herein incorporated by reference in its entirety for all purposes.

The computing system of the vehicle may determine a heatmap based on the sensor data, the map data, the per-ception data, the prediction data, or the like. In some examples, the heatmap can be used as input for cost calcu-lation as described herein. The heatmap can refer to a visualization technique used to represent a set of values discretized over a region or area. A heatmap can include a 2-dimensional (2D) array of cells, each of which can rep-resent an approximation of a metric (e.g., the distance of the vehicle to the nearest crosswalk, a distance of an object to the nearest crosswalk, etc.). In at least some examples, heatmaps may have multiple layers and/or be represented as a tensor to incorporate additional information for each metric at a particular region indicated by the cell.

In some instances, there can be various types of heatmaps, such as the green surface heatmap, the oncoming surface distance heatmap indicating for a given cell the nearest oncoming lane or surface, the crosswalk distance heatmap, etc. The green surface heatmap can represent distances to drivable surfaces and/or a distance of an object to the current lane in which the vehicle is operating in the environment. A drivable surface may refer to an area or terrain where a vehicle can operate such as surfaces of roads, highways, streets, parking lots, pathways, or the like and excluding areas like buildings, sidewalks, etc. The oncoming surface distance heatmap may represent a distance to a drivable surface in oncoming traffic in the environment and/or a distance of an object to an oncoming lane with respect to the current lane in which the vehicle is operating in the envi-ronment. A distance heatmap can represent distances of crosswalks in the environment indicating how far away a crosswalk is with respect to a reference location (e.g., the center of a junction, a boundary of the crosswalk, etc.). In some instances, different types of heatmaps can be combined together to represent different characteristics of features (e.g., roads, lanes, crosswalks, objects, vehicles, etc.) in the environment. In some instances, the heatmap can include information on identifications (IDs) of crosswalks. For example, there may be four crosswalks at a junction, and the heatmap can include information on the identifications of a first crosswalk, a second crosswalk, a third crosswalk, and a fourth crosswalk, such that the computing system of the vehicle can identify different crosswalks in the heatmap.

The computing system of the vehicle may determine a cost associated with a crosswalk based on the heatmap, the map data, the sensor data, the perception data, the prediction data, or the like. In some instances, the computing system of the vehicle may determine the cost associated with the crosswalk based at least in part on Factor 1: the vehicle velocity, Factor 2: a first distance of the vehicle to a first boundary of the crosswalk, Factor 3: a second distance of the object to a boundary of the crosswalk on the path of the vehicle (e.g., in a current lane in which the vehicle is operating), and Factor 4: a third distance of the object to a boundary of the crosswalk in a related lane (e.g., an oncom-ing lane, an adjacent lane, etc.). In some examples, the cost can be some combination (such as the multiplication of) the weights of the above four factors. Note that these factors are exemplary rather than limiting. Such factors are optional and can be replaced by other factors. Moreover, additional factors can be used to determine the cost associated with the crosswalk. Moreover, as described herein, the vehicle may have additional future states as the vehicle traverses the environment. In some instances, the cost associated with the crosswalk can be calculated over time based on the addi-tional future states of the object and/or the vehicle.

In some instances, the cost can be determined further based on other factors such as the type and/or characteristics of the object. For example, different types of objects (e.g., a pedestrian, a bicycle, a pedestrian with a baby stroller, a wheeled pedestrian, a pedestrian with a shopping cart, etc.) can have different costs. In some examples, the wheeled pedestrian may refer to a pedestrian with wheeled transport-ers such as a wheelchair, a scooter, a stroller, a skateboard, a Segway, etc. In some instances, the cost calculation can be further based on the moving direction of the object. For example, an object moving toward the vehicle can have a higher cost, while an object moving away from the vehicle can have a lower cost.

In some instances, when planning the path for the vehicle, the planning system of the vehicle can use the cost associ-ated with the crosswalk with or without a control policy. A control policy may refer to a sanity check to prevent the vehicle from operating unsafely. For example, a control policy can be formulated to achieve the effect of a caution reaction or a stop reaction for the vehicle. As an example of a caution reaction, the control policy can require the vehicle to slow down when the vehicle is within a threshold distance to a crosswalk through which an object has the intent to cross the road. As an example of a stop reaction, the control policy can require the vehicle to stop completely before the crosswalk if there is a prediction that the vehicle is likely to interact with or impact the object in the crosswalk.

There can be some situations where limitations may occur when the cost is calculated. Techniques discussed herein can address these limitations by improving the planning of the vehicle. In some cases, there is only the green surface heatmap that can provide Factor 3 (the second distance of the object to a boundary of the crosswalk on the path of the vehicle), but there is no oncoming surface distance heatmap which can provide Factor 4 (the third distance of the object to a boundary of the crosswalk in a related lane). In such a situation, it can be hard to calculate the cost associated with the crosswalk without Factor 4. Therefore, techniques discussed herein can improve the cost calculation by providing an oncoming surface distance heatmap indicating information on the third distance of the object to a boundary of the crosswalk in a related lane (Factor 4).

In some instances, Factor 4 can be sensitive to the object's position. If the object is just at the edge of the threshold distance (e.g., 3 meters, 5 meters, or the like) to the crosswalk in the related lane, the weight of Factor 4 can be 0 or a small value close to 0. In such a case, when the cost is a product of the weights of the four factors, the cost can be 0 or close to 0. Thus, techniques discussed herein can improve the planning of the vehicle by adding a buffer value to Factor 4, such that when the object is at the edge of the threshold distance to the crosswalk in the related lane, the weight of Factor 4 is not 0 or too close to 0, and the cost associated with the crosswalk will not be 0 or close to 0. Therefore, the vehicle can pass through the crosswalk with caution or slow down due to a relatively high value of the cost.

In some instances, the crosswalk heatmap may only return the distance of the nearest crosswalk to the vehicle in the path of the vehicle. However, there may be multiple crosswalks at a junction or along the road, and the computing system of the vehicle may need to calculate the cost associated with the crosswalk based on an updated state. In some cases, the vehicle may not have enough time to react to the exiting crosswalk after passing through the entering crosswalk, when the two crosswalks are very close to each other. Therefore, techniques discussed herein can improve the planning of the vehicle by providing distances of multiple crosswalks to the planning system of the vehicle, such that the planning system of the vehicle can calculate the costs of multiple crosswalks along the path of the vehicle and plan ahead for the vehicle.

The techniques discussed herein may improve the computing system of the vehicle in a number of ways. As mentioned above, the vehicle computing system can plan trajectories for the vehicle to follow in an environment. In some examples, the vehicle computing system may determine a cost associated with a crosswalk detected in the environment and control the vehicle to navigate safely based on the cost. Therefore, even if the crosswalk is in a given state (e.g., a crosswalk without traffic signals or traffic signs, a crosswalk in a non-crossable state, etc.) when an object is crossing the road through the crosswalk, the vehicle can operate in a cautious and safe manner by slowing down, yielding, or stopping. As such, the computing system of the vehicle can determine the trajectories for the vehicle efficiently in various scenarios, saving valuable computing resources and storage space, and improving safety of the vehicle. These and other improvements are discussed herein and may, in some instances, be achieved using the techniques described herein.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or any system using machine vision (e.g., in a system using image data). Additionally, the techniques described herein may be used with real data (e.g., captured using sensor(s)), simulated data (e.g., generated by a simulator), or any combination of the two.

Figure 1B:
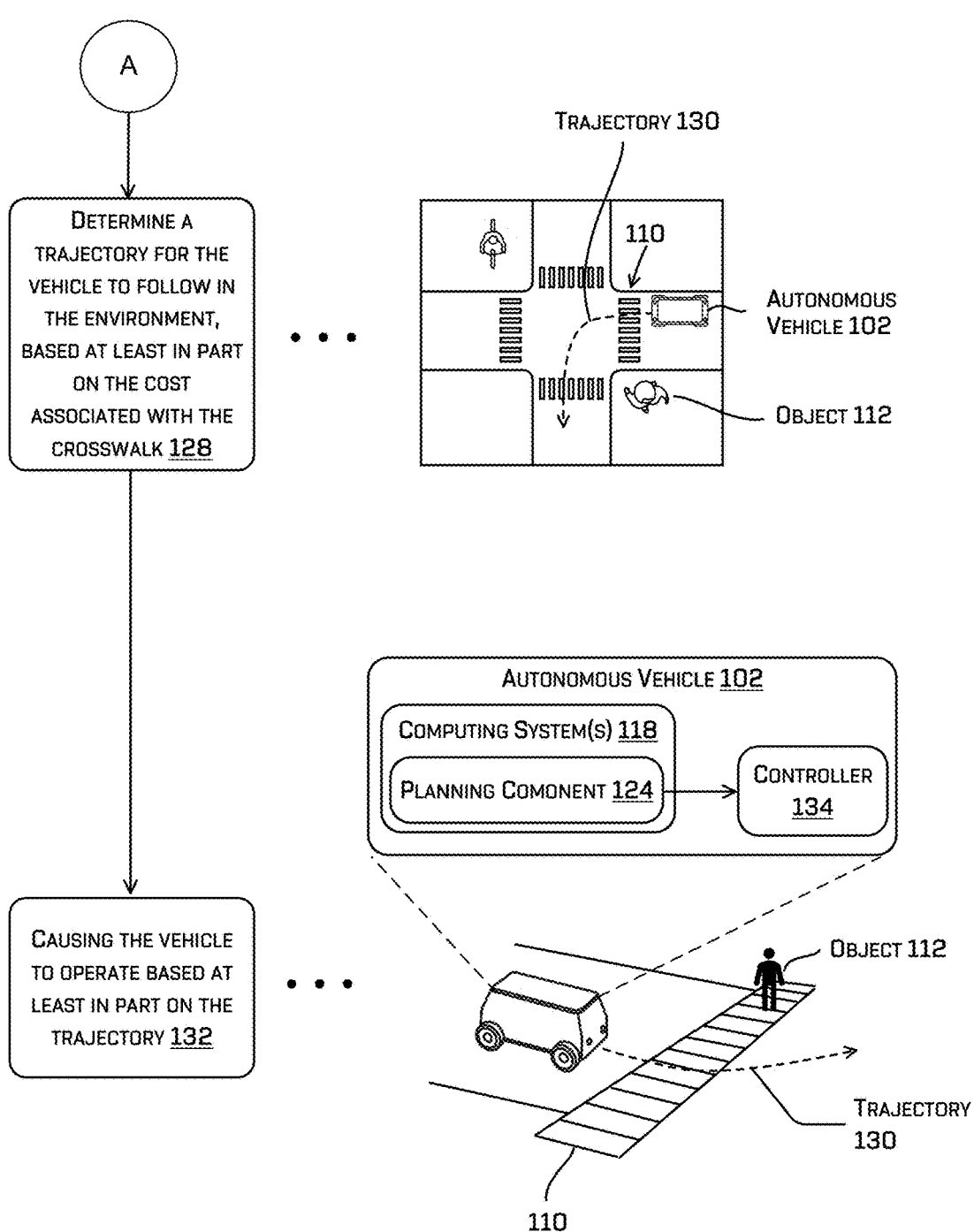

FIG. 1A and FIG. 1B illustrate a pictorial flow diagram of a process 100 for generating a trajectory across a crosswalk for an autonomous vehicle 102 based on a cost associated with the crosswalk in an environment in which the autonomous vehicle 102 is operating. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. It is contemplated that the techniques discussed herein may apply to more than robotic control, such as for autonomous vehicles. For example, the techniques discussed herein may be applied to path-finding in simulations, video games, manufacturing, augmented reality, etc., and/or may be used by spacecraft, watercraft, aircraft, or the like in addition to or instead of land vehicles.

At 104, the process 100 can include receiving sensor data 116 of the environment captured by sensors 106 of the autonomous vehicle 102. In some instances, the autonomous vehicle 102 can be equipped with sensors 106 including but not limited to lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc.

In some instances, the sensor data 116 may include a location signal (e.g., a GPS signal), an inertia signal (e.g., an accelerometer signal, a gyroscope signal, etc.), a magnetometer signal, a wheel encoder signal, a speedometer signal, a point cloud of accumulated lidar and/or radar points, time of flight data, an image (or images), an audio signal, and/or bariatric or other environmental signals, etc.

At 108, the process 100 can include determining, based at least in part on the sensor data 116, a crosswalk 110 and an object 112 associated with the crosswalk 110 in the environment (e.g., is within a threshold distance of the crosswalk and/or is predicted, based on the sensor data, to be within the threshold distance of the crosswalk within some threshold time in the future with some threshold confidence level). For example, the autonomous vehicle 102 traveling in the environment may approach the crosswalk 110. There is an object 112 (e.g., a pedestrian) near the crosswalk 110, and may cross the road through the crosswalk 110. In some instances, the crosswalk can be entering crosswalks and exiting crosswalks, crossable crosswalks, and non-crossable crosswalks, controlled crosswalks and uncontrolled crosswalks, protected crosswalks and unprotected crosswalks, etc. In some instances, the crosswalk can locate in a junction, an intersection, or a roundabout. Alternatively, the crosswalk can locate in the middle of the road without being associated with any junctions or intersections. In some examples, the crosswalk can be associated with or without traffic signals and/or traffic signs. In some examples, the crosswalk can be marked in the map data. Alternatively, the crosswalk can be unmarked in the map data and can be detected based on the sensor data.

The computing system 118 may be configured to identify objects in the environment. In some examples, the objects may be identified based on sensor data 116 from sensors (e.g., cameras, motion detectors, light detection and ranging (LIDAR), radio detection and ranging (RADAR), etc.) of the autonomous vehicle 102. In some examples, the objects may be identified based on sensor data 116 received from remote sensors, such as, for example, sensors associated with another autonomous vehicle 102 or sensors mounted in an environment that is configured to share data with a plurality of autonomous vehicles.

In some instances, the planning component 124 can generate a heatmap generated based on the sensor data 116, the perception data, the prediction data, or the like. As described herein, there can be various types of heatmaps, such as the green surface heatmap, the oncoming surface distance heatmap, the crosswalk distance heatmap, etc.

At 114, the process 100 can include determining, based at least in part on the contextual factors associated with the crosswalk, a cost associated with the crosswalk. In some instances, the autonomous vehicle 102 can be equipped with the computing system(s) 118. The computing system(s) 118 may have a perception component 120, a prediction component 122, and a planning component 124.

The perception component 120 may be configured to use the sensor data 116 to determine perception data such as a presence of an object, an object classification (e.g., a car, a pedestrian, a cyclist, an animal, a building, etc.), a characteristic of the object (e.g., a velocity of the object, an orientation of the object, a pose of the object, a moving direction of the object, an acceleration of object, a size of the object, etc.), environmental data (e.g., a road, a lane, a crosswalk, a curb, a sidewalk, a traffic light, a traffic sign, etc.), a characteristic of the autonomous vehicle 102 (e.g., a velocity of the autonomous vehicle 102, an orientation of the autonomous vehicle 102, a pose of the autonomous vehicle 102, a moving direction of the autonomous vehicle 102, an acceleration of autonomous vehicle 102, etc.), or the like. In some examples, perception component 120 may determine whether the crosswalk is in a crossable state or a non-crossable state, whether the location of the vehicle is already within the crosswalk, whether the vehicle is likely to stop within the crosswalk, and/or the like. While these are just a few examples of factors that can be determined by the perception component 120, in other examples, the vehicle may determine additional and/or alternatively factor(s). In some instances, the map data and/or sensor data may be used to identify the crosswalk locations.

The prediction component 122 may be configured to generate predicted trajectories of objects (e.g., a pedestrian, a cyclist, an animal, a wheeled pedestrian, etc.) in an environment. For example, the prediction component 122 may generate one or more predicted trajectories for objects within a threshold distance from a crosswalk. In some examples, the prediction component 122 may measure a trace of an object and generate a trajectory for the object based on the observed and predicted behavior of the object. Details of trajectory prediction of objects are discussed in U.S. application Ser. No. 15/833,715, which is herein incorporated by reference in its entirety for all purposes.

The planning component 124 may be configured to plan trajectories for the autonomous vehicle 102 in the environment based at least in part on the sensor data 116, the perception data, and the prediction data. Details of trajectory planning using a tree search are discussed in U.S. application Ser. Nos. 16/908,389, 16/889,238, and 16/539,928, which are herein incorporated by reference in their entirety for all purposes.

In some examples, the contextual factors associated with the crosswalk may include the velocity of the autonomous vehicle 102 (Factor 1), a first distance of the autonomous vehicle 102 to the crosswalk (Factor 2), a second distance of the object to a second boundary of the crosswalk in a current lane for the autonomous vehicle 102 to operate (Factor 3), and a third distance of the object to a third boundary of the crosswalk in a related lane (Factor 4).

At 126, the process 100 can include determining, based at least in part on the contextual factors associated with the crosswalk 110, a cost associated with the crosswalk 110. In some examples, the cost can be the multiplication of the above four factors (Factor 1, Factor 2, Factor 3, and Factor 4). Note that these factors are exemplary rather than limiting. Such factors are optional and can be replaced by, incorporated with, or modified by other factors. Moreover, additional factors can be used to determine the cost associated with the crosswalk. In some instances, the computing system of the autonomous vehicle 102 may determine the cost associated with the crosswalk based on the heatmap described herein.

In some instances, the cost can be further determined based on other factors such as the type and/or characteristics of the object. For example, different types of objects (e.g., a pedestrian, a bicycle, a pedestrian with a baby stroller, a wheeled pedestrian, a pedestrian with a shopping cart, etc.) can have different costs. In some instances, the cost calculation can be further based on the moving direction of the object. For example, an object moving toward the autonomous vehicle 102 can have a higher cost, while an object moving away from the autonomous vehicle 102 can have a lower cost. Moreover, as described herein, the autonomous vehicle 102 may update the states as the autonomous vehicle 102 traverses the environment. The cost associated with the crosswalk 110 can be calculated over time based on the updated states.

At 128, the process 100 can include determining a trajectory 130 for the autonomous vehicle 102 to follow in the environment, based at least in part on the cost associated with the crosswalk 110. As described above, the computing system(s) 118 can include a planning component 124 configured to plan trajectories for the autonomous vehicle 102 in the environment. In some instances, the planning component 124 may determine various routes and trajectories and various levels of detail for the autonomous vehicle 102. For example, the planning component 124 may determine a route to travel from a first location (e.g., a current location) to a second location (e.g., a target location). Further, the planning component 124 may generate an instruction and actions for guiding the autonomous vehicle 102 along at least a portion of the trajectory. In some examples, the instruction may be a trajectory, or a portion of a trajectory. In some examples, multiple trajectories may be substantially simultaneously generated periodically or on demand, and one of the multiple trajectories can be selected for the autonomous vehicle 102 to navigate. In some examples, the planning component 124 may perform trajectory planning by performing a tree search based on costs. In some instances, the planning component 124 may select a trajectory with the lowest cost from multiple candidate trajectories.

In some instances, the trajectory 130 can include information on actions to be taken by the autonomous vehicle 102 along the trajectory 130, such as a slowing down action, a yielding action, a stopping action, a merging action, a left turning action, a right turning action, a merging action, or the like. In some instances, the actions to be taken by the autonomous vehicle 102 may include information about a deceleration of the autonomous vehicle 102, an acceleration of the autonomous vehicle 102, a desired velocity of the autonomous vehicle 102, a desired stopping position of the autonomous vehicle 102, a turning point of the autonomous vehicle 102, a merging point of the autonomous vehicle 102, or the like.

At 132, the process 100 can include causing the autonomous vehicle 102 to operate based at least in part on the trajectory 130. The computing system(s) 118 may include a controller(s) 134, which may be configured to control steering, propulsion, braking, safety, emitters, communication, and other systems of the autonomous vehicle 102. The controller(s) 134 may communicate with other components of the autonomous vehicle 102 602. For example, controller(s) 134 may receive the trajectory 130 from the planning component 124 and control the autonomous vehicle 102 to follow the trajectory 130 generated or selected by the planning component 124.

Figure 2A:
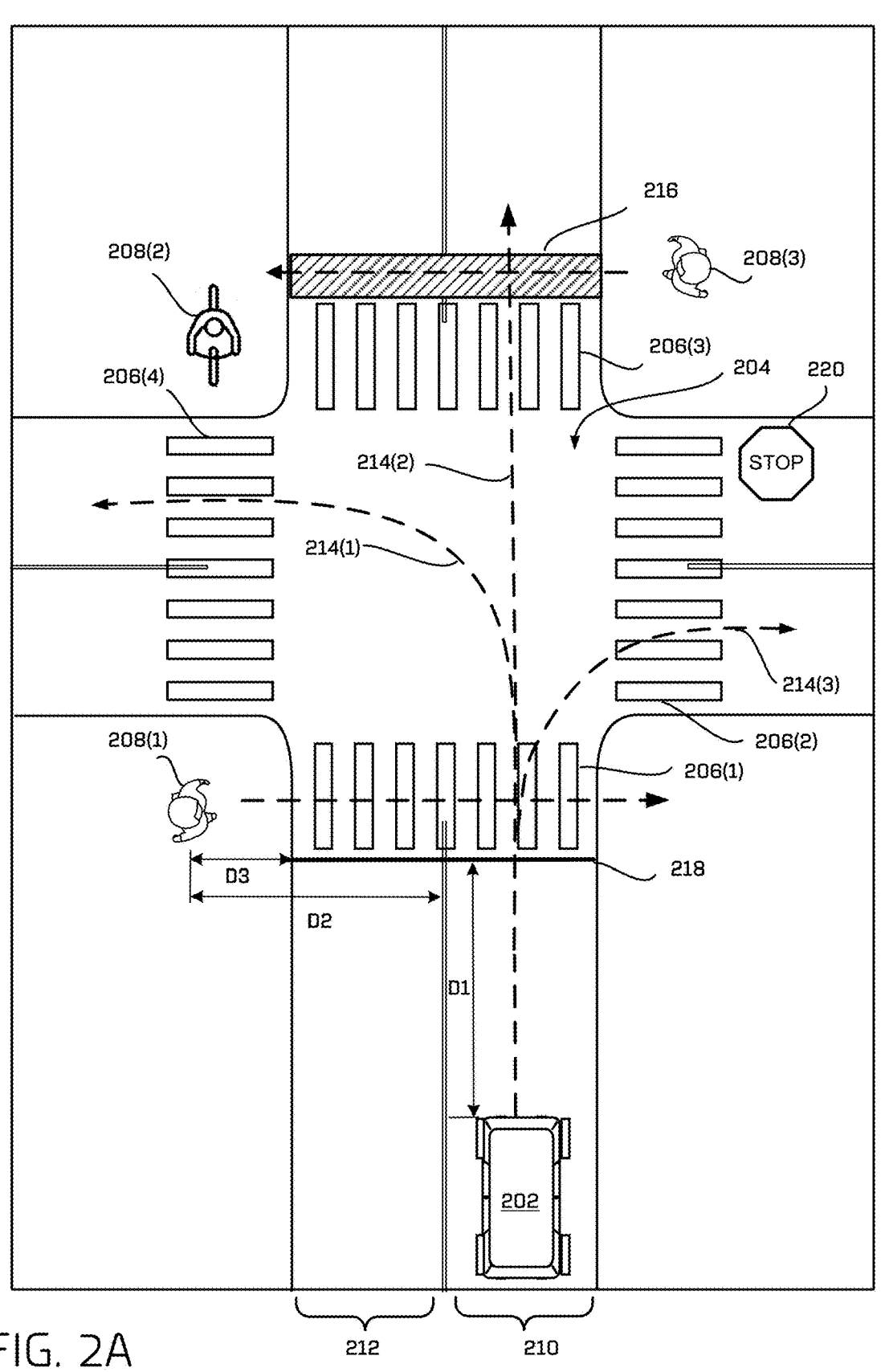
FIG. 2A illustrates an example scenario including crosswalks and objects for a vehicle to operate.

FIG. 2A illustrates an example scenario 200(1) including crosswalks and objects for a vehicle 202 to operate. The vehicle 202 can be equipped with sensors that can collect sensor data of the environment while the vehicle 202 is operating in the environment. A computing system of the vehicle 202 can identify the junction 204, crosswalks (a first crosswalk 206(1), a second crosswalk 206(2), a third crosswalk 206(3), and a fourth crosswalk 206(4)), objects (208 (1)-208(3)), a current lane in which the vehicle 202 is traveling, a related lane 212 (e.g., an adjacent lane, an oncoming lane, or the like) and other features in the environment based on the sensor data. A planning component of the computing system of the vehicle 202 can plan a trajectory (such as a left turn trajectory 214(1), a moving forward trajectory 214(2), or a right turn trajectory 214(3)) for the vehicle 202.

In some instances, a buffer region 216 can be added along the edge of the third crosswalk 206(3) such that when the object 208(3) crosses the road not exactly within the third crosswalk 206(3), the vehicle 202 can still take reaction to the object 208(3) when planning the trajectories. In some instances, the crosswalk can be unmarked in the map data and can be detected based on the sensor data. In some instances, the vehicle can detect an object that is jaywalking based on predicted paths of objects and/or previous observations for a given area.

In some instances, the computing system of the vehicle 202 can calculate a cost associated with the first crosswalk 206(1) as the vehicle 202 is approaching the first crosswalk 206(1). For example, the computing system of the vehicle 202 can detect or calculate the vehicle velocity (Factor 1), a first distance D1 of the vehicle 202 to a boundary of the first crosswalk 206(1) (Factor 2), a second distance D2 of the object 208(1) to a boundary of the first crosswalk 206(1) in the current lane 210 in which the vehicle 202 is operating (Factor 3), and a third distance D3 of the object 208(1) to a boundary of the first crosswalk 206(1) in the related lane 212 (Factor 4). In some examples, the computing system of the vehicle 202 can calculate the cost associated with the first crosswalk 206(1) by calculating a function (such as the multiplication) of the weights of the above four factors. Note that these factors are exemplary rather than limiting. Such factors are optional and can be replaced by other factors. Moreover, additional factors can be used to determine the cost associated with the crosswalk. In any example described herein, the process may be performed independently for a plurality of objects proximate one or more crosswalks. In such examples, various costs may be computed and combined (e.g., as a sum, product, maximum, minimum, average, or other mathematical operation). Additionally, or alternatively, such costs may be evaluated independently. In some cases, such computations may leverage parallel operation (such as General Purpose Graphics Processing Unit, GPGPU) to efficiently and quickly consider all such objects.

Moreover, as described herein, the vehicle 202 may consider additional future states as the vehicle 202 passes through the junction 204. The costs associated with crosswalks can be calculated over time based on the additional future states. For example, after passing through the entering crosswalk (i.e., the first crosswalk 206(1)), the computing system of the vehicle 202 can calculate the cost associated with the exiting crosswalk (i.e., the fourth crosswalk 206 (4)).

In some instances, the cost can be determined further based on other factors such as the type and/or characteristics of the object, the moving direction of the object, or the like. For example, different types of objects (e.g., a pedestrian, a bicycle, a pedestrian with a baby stroller, a wheeled pedestrian, a pedestrian with a shopping cart, etc.) can have different costs. In some examples, the wheeled pedestrian may refer to a pedestrian with wheeled transporters such as a wheelchair, a scooter, a skateboard, a Segway, etc. In some examples, an object moving toward the vehicle can have a higher cost, while an object moving away from the vehicle can have a lower cost.

As described above, a crosswalk can be an "entering crosswalk" or an "exiting crosswalk." As an example, on the left turn trajectory 214(1) of the vehicle 202, the first crosswalk 206(1) can be referred to as the entering crosswalk, and the fourth crosswalk 206(4) can be referred to as the exiting crosswalk. As another example, on the moving forward trajectory 214(2) of the vehicle 202, the first crosswalk 206(1) can be referred to as the entering crosswalk, and the third crosswalk 206(3) can be referred to as the exiting crosswalk. As another example, on the right turn, trajectory 214(3) of the vehicle 202, the first crosswalk 206(1) can be referred to as the entering crosswalk, and the second crosswalk 206(2) can be referred to as the exiting crosswalk. In some instances, after the vehicle 202 passes the entering crosswalk, the cost of the entering crosswalk can be determined to be zero, because the status of the entering crosswalk no longer affects the operation of the vehicle 202.

As described above, a crosswalk can be a "controlled crosswalk" or an "uncontrolled crosswalk." As an example, the first crosswalk 206(1) is associated with a stop line 218, and can be a controlled crosswalk. As another example, the second crosswalk 206(2) is associated with a stop sign 220, and can be a controlled crosswalk.

Figure 2B:
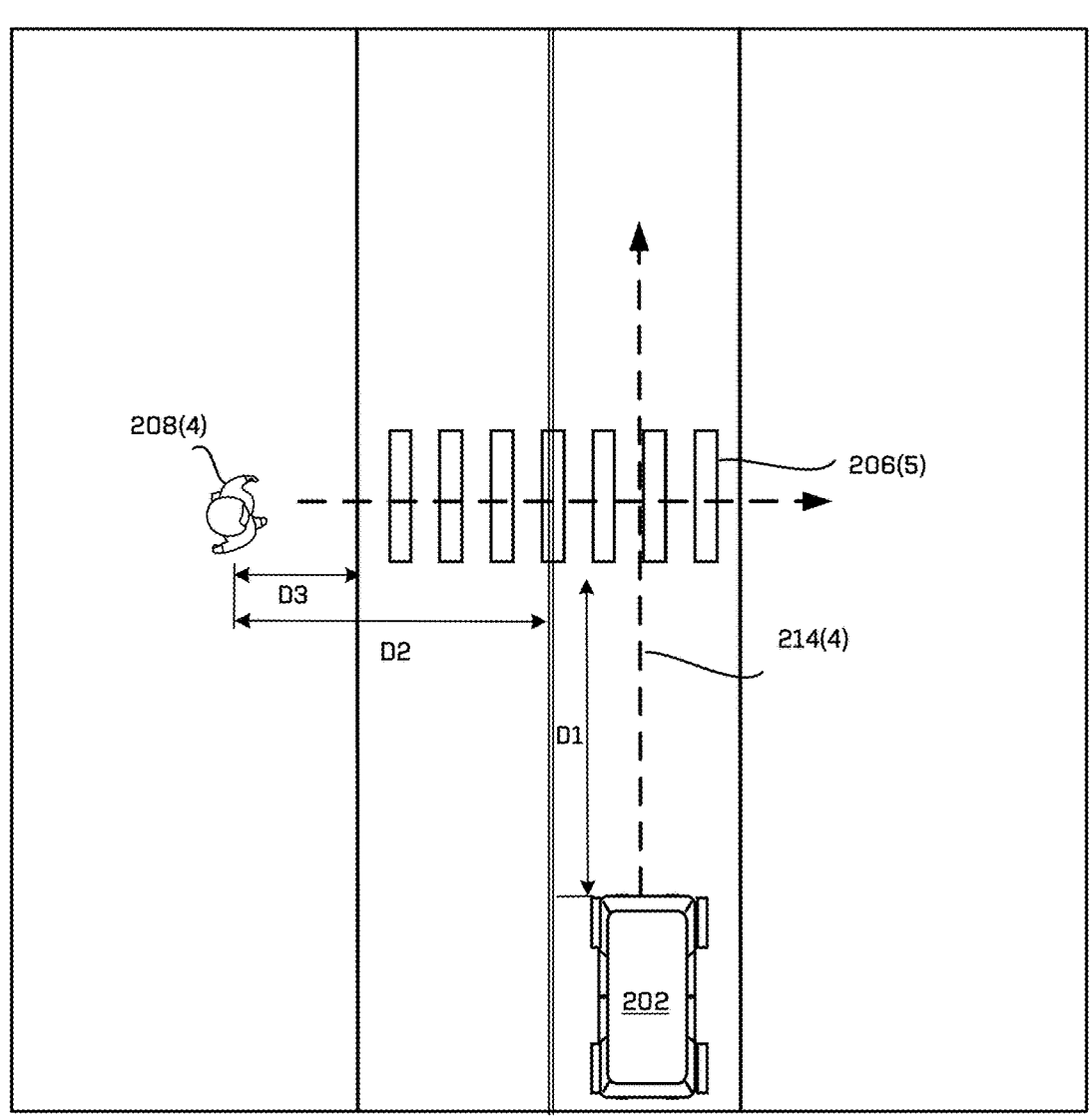
FIG. 2B illustrates an example scenario including an uncontrolled crosswalk 206(5) across the trajectory of the vehicle.

FIG. 2B illustrates an example scenario 200(2) including an uncontrolled crosswalk 206(5) across the trajectory 214

(4) of the vehicle 202. In this scenario, the crosswalk 206(5) is not associated with any traffic signs (e.g., stop lines, stop signs, yield signs, pedestrian crossing signs, etc.) or traffic signals (e.g., traffic lights, pedestrian crossing signals, arrow traffic lights, countdown timer, or the like). In this example, the uncontrolled crosswalk 206(5) is located in the middle of the road. For example, there can be an object 208(4) close to the uncontrolled crosswalk 206(5). When the vehicle 202 approaches the uncontrolled crosswalk 206(5), the planning system of the vehicle 202 can determine a cost associated with the uncontrolled crosswalk 206(5), and a trajectory 214(4) for the vehicle 202.

As described above, a crosswalk can be a "protected crosswalk" or an "unprotected crosswalk." FIGS. 2C-2G illustrates example scenarios including unprotected and protected crosswalks.

Figure 2C:
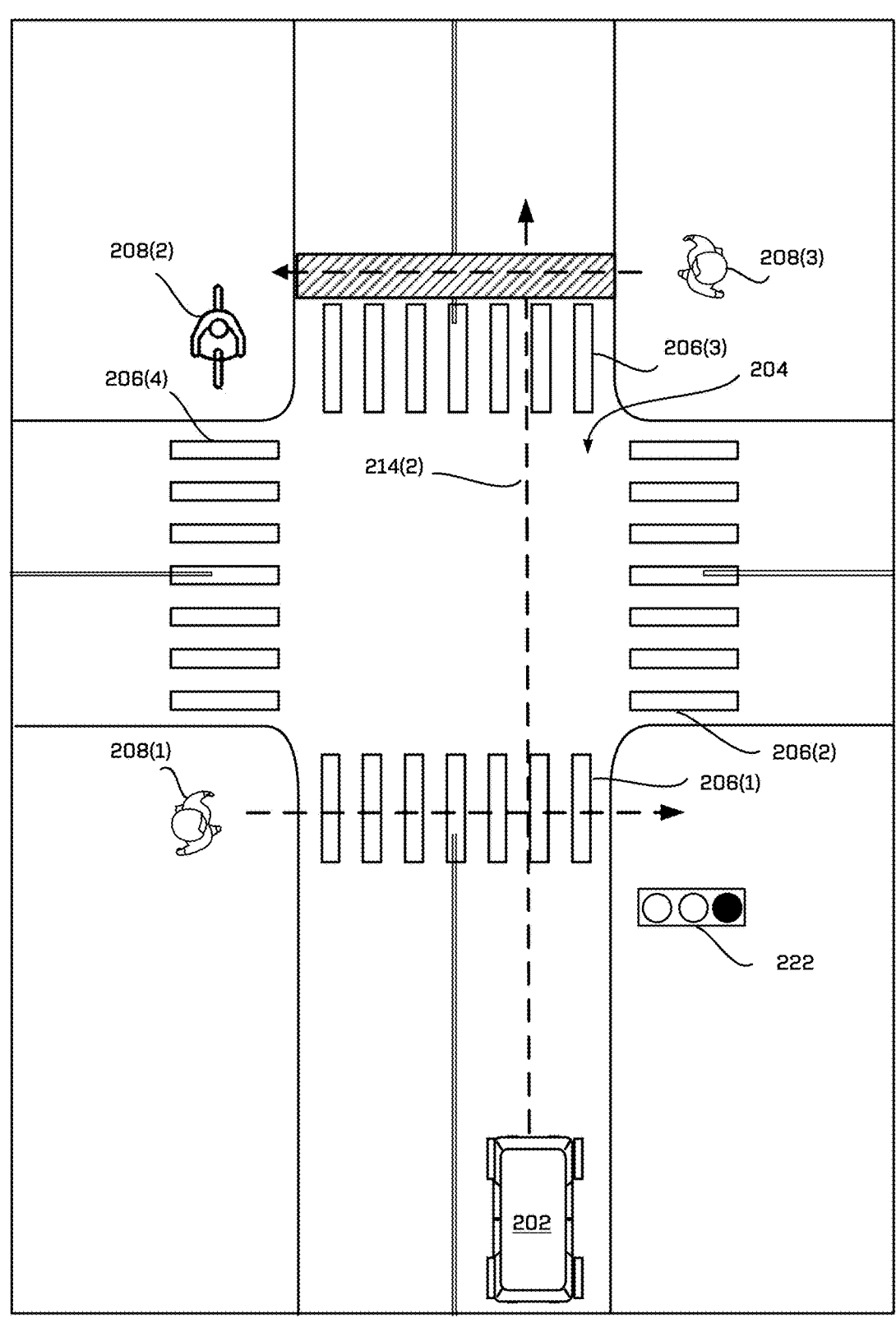
FIG. 2C illustrates an example scenario including unprotected crosswalks across the trajectory of the vehicle.

FIG. 2C illustrates an example scenario 200(3) including unprotected crosswalks 206(1) and 206(2) across the trajectory 214(2) of the vehicle 202. As an example, the traffic light 222 is associated with the junction 204. When the traffic light 222 is green and the vehicle 202 is traveling straight through the junction 204, both the first crosswalk (entering crosswalk) 206(1) and the second crosswalk (exiting crosswalk) 206(2) can be protected crosswalks.

Figure 2D:
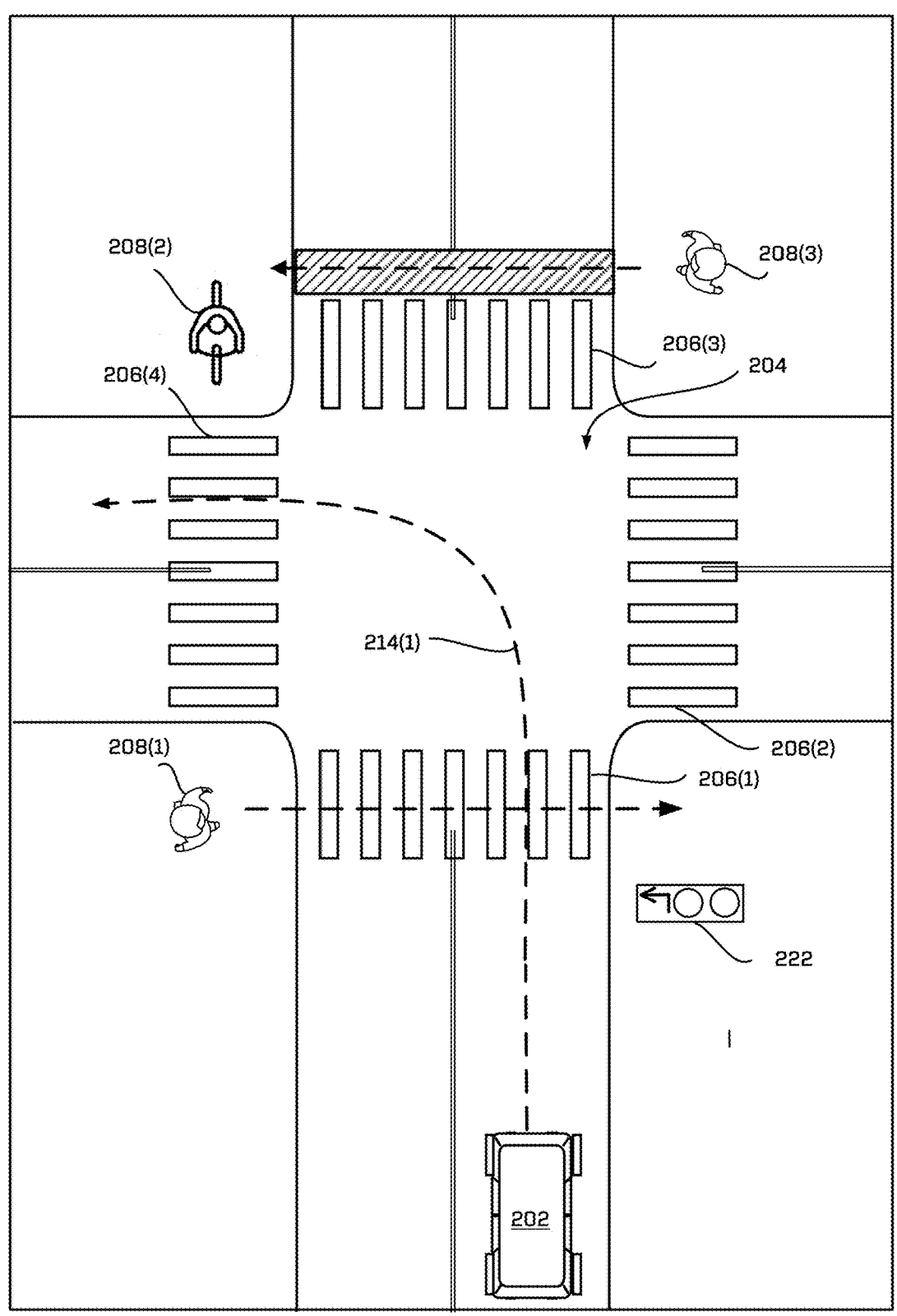
FIG. 2D illustrates an example scenario including protected crosswalks across the trajectory of the vehicle.

FIG. 2D illustrates an example scenario 200(3) including protected crosswalks 206(1) and 206(4) across the trajectory 214(1) of the vehicle 202. When the traffic light 222 displays a green left-turn arrow and the vehicle 202 is turning left, then both the first crosswalk (entering crosswalk) 206(1) and the second crosswalk (exiting crosswalk) 206(4) can be protected crosswalks.

Figure 2E:
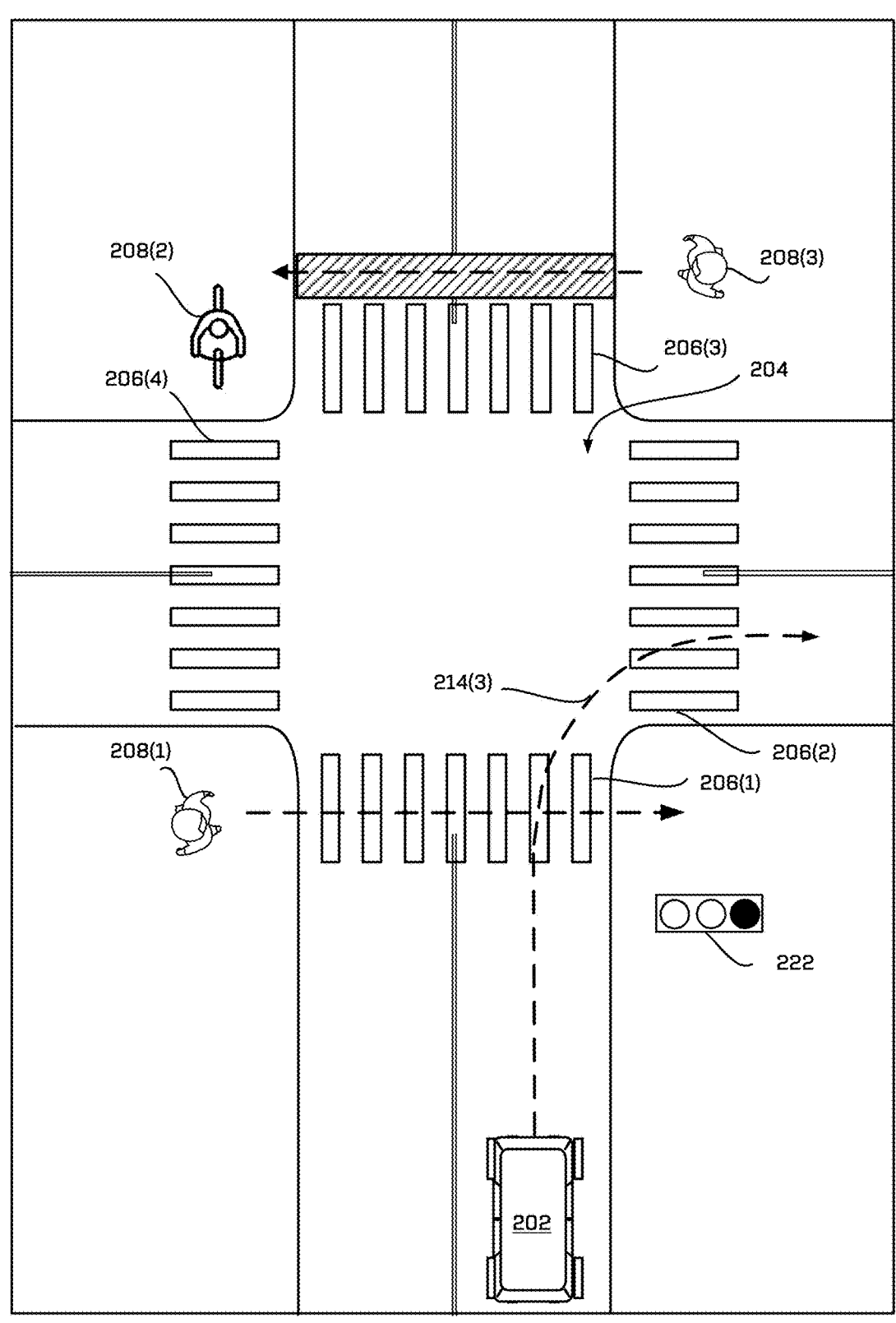
FIG. 2E illustrates an example scenario including a protected crosswalk 206(1) and an unprotected crosswalk across the trajectory of the vehicle.

FIG. 2E illustrates an example scenario 200(4) including a protected crosswalk 206(1) and an unprotected crosswalk 206(2) across the trajectory 214(3) of the vehicle 202. When the traffic light 222 is green and the vehicle 202 is turning right, the first crosswalk (entering crosswalk) 206(1) can be a protected crosswalk, while the second crosswalk (exiting crosswalk) 206(2) can be an unprotected crosswalk.

Figure 2F:
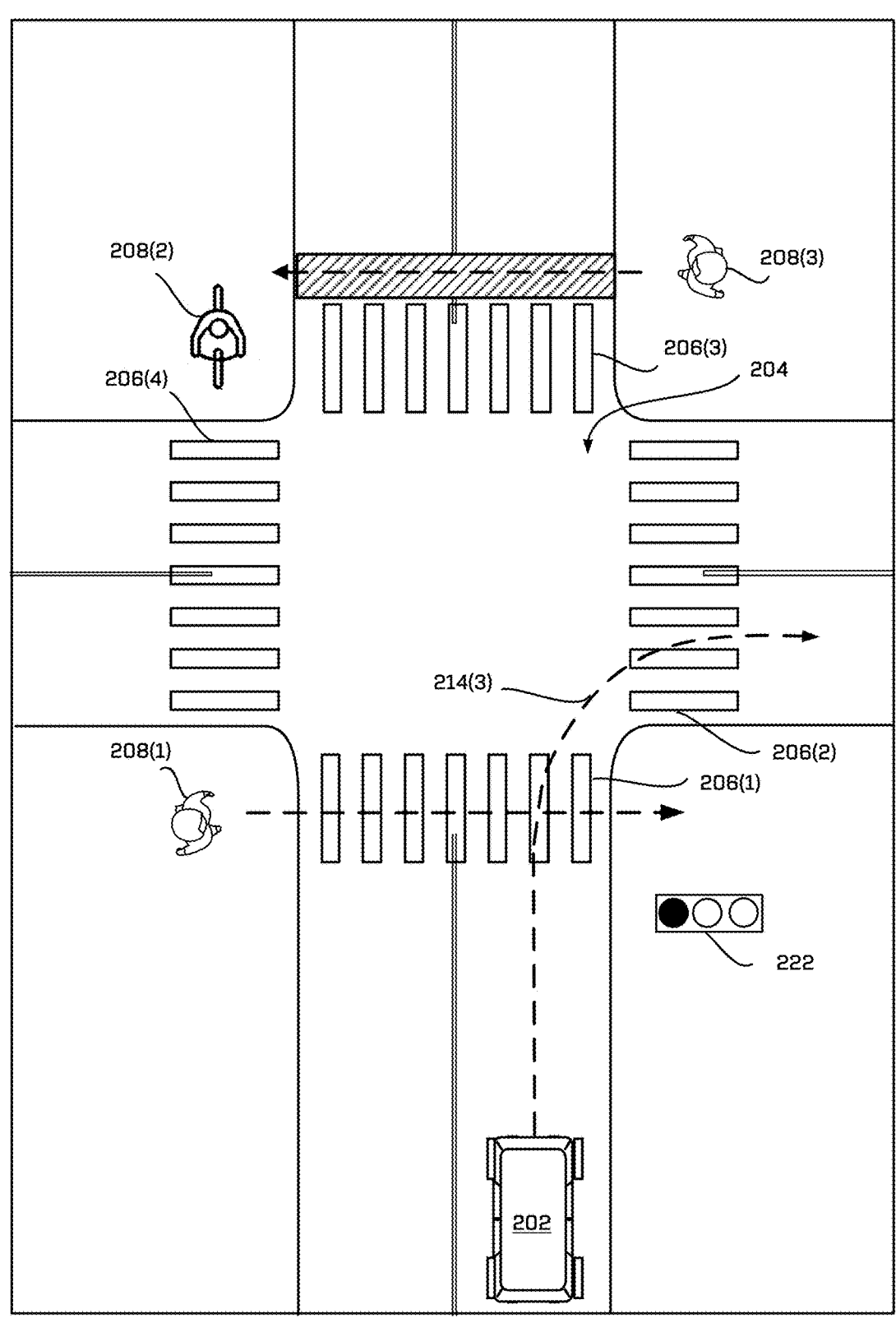
FIG. 2F illustrates an example scenario including unprotected crosswalks across the trajectory of the vehicle.

FIG. 2F illustrates an example scenario 200(5) including unprotected crosswalks 206(1) and 206(2) across the trajectory 214(3) of the vehicle 202. When the traffic light 222 is red and the vehicle 202 is turning right, the first crosswalk (entering crosswalk) 206(1) and the second crosswalk (exiting crosswalk) 206(2) can both be unprotected crosswalks.

Figure 2G:
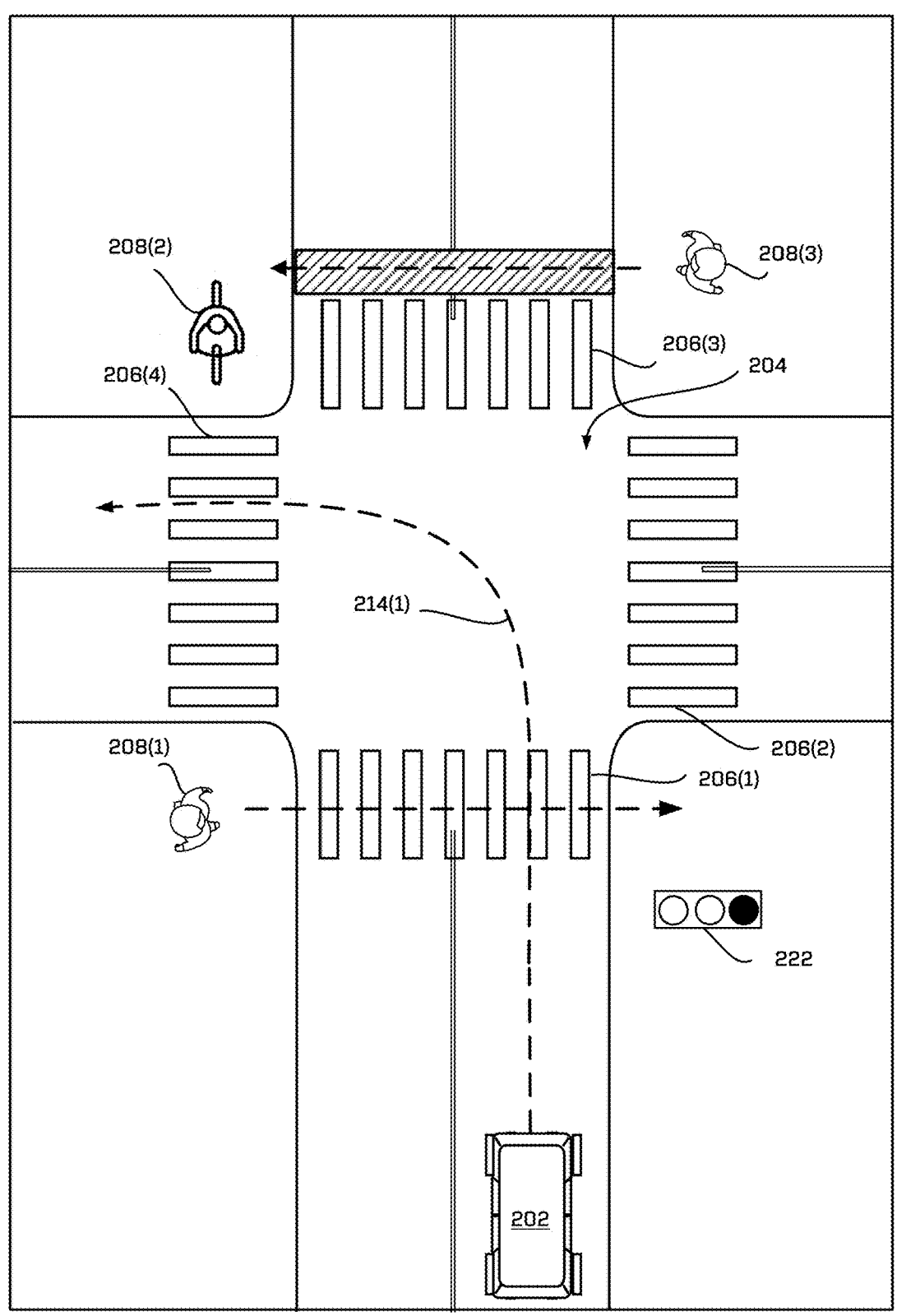
FIG. 2G illustrates an example scenario including unprotected crosswalks across the trajectory of the vehicle.

FIG. 2G illustrates an example scenario 200(6) including unprotected crosswalks 206(1) and 206(4) across the trajectory 214(1) of the vehicle 202. When the traffic light 222 is green and the vehicle 202 is turning left (unprotected left turn), the first crosswalk (entering crosswalk) 206(1) can a protected crosswalk, while the fourth crosswalk (exiting crosswalk) 206(4) can be an unprotected crosswalk.

In the above example scenarios depicted in FIGS. 2C-2G, the vehicle 202 can determine a cost associated with a crosswalk based on the state of the crosswalk. For example, an object (e.g., 208(1)-208(3)) may cross the road through a protected crosswalk. When a crosswalk is in a protected state, pedestrians have the right of way, and vehicles should yield or stop to allow pedestrians to cross the road. For example, the vehicle can determine that the crosswalk is in a protected state, and determine the cost associated with the protected crosswalk to be zero.

In some instances, under some circumstances, such as when there is an emergency, when the pedestrian misreads the traffic signal, when there are no traffic signs or traffic lights, when there is a gap in the traffic flow, or the like, the object (e.g., 208(1)-208(3)) may cross the road through an unprotected crosswalk. When a crosswalk is in an unprotected state, the vehicle 202 has the right of way and pedestrians should wait for the traffic signal to change or the vehicle to yield. In such cases, the vehicle 202 can determine that the crosswalk is in an unprotected state, and determine a cost associated with the uncontrolled crosswalk based on methods and processes described throughout this disclosure, such that the vehicle can slow down, yield, or stop to let the object (e.g., 208(1)-208(3)) cross the road through the uncontrolled crosswalk without leaving the crosswalk.

Figure 2H:
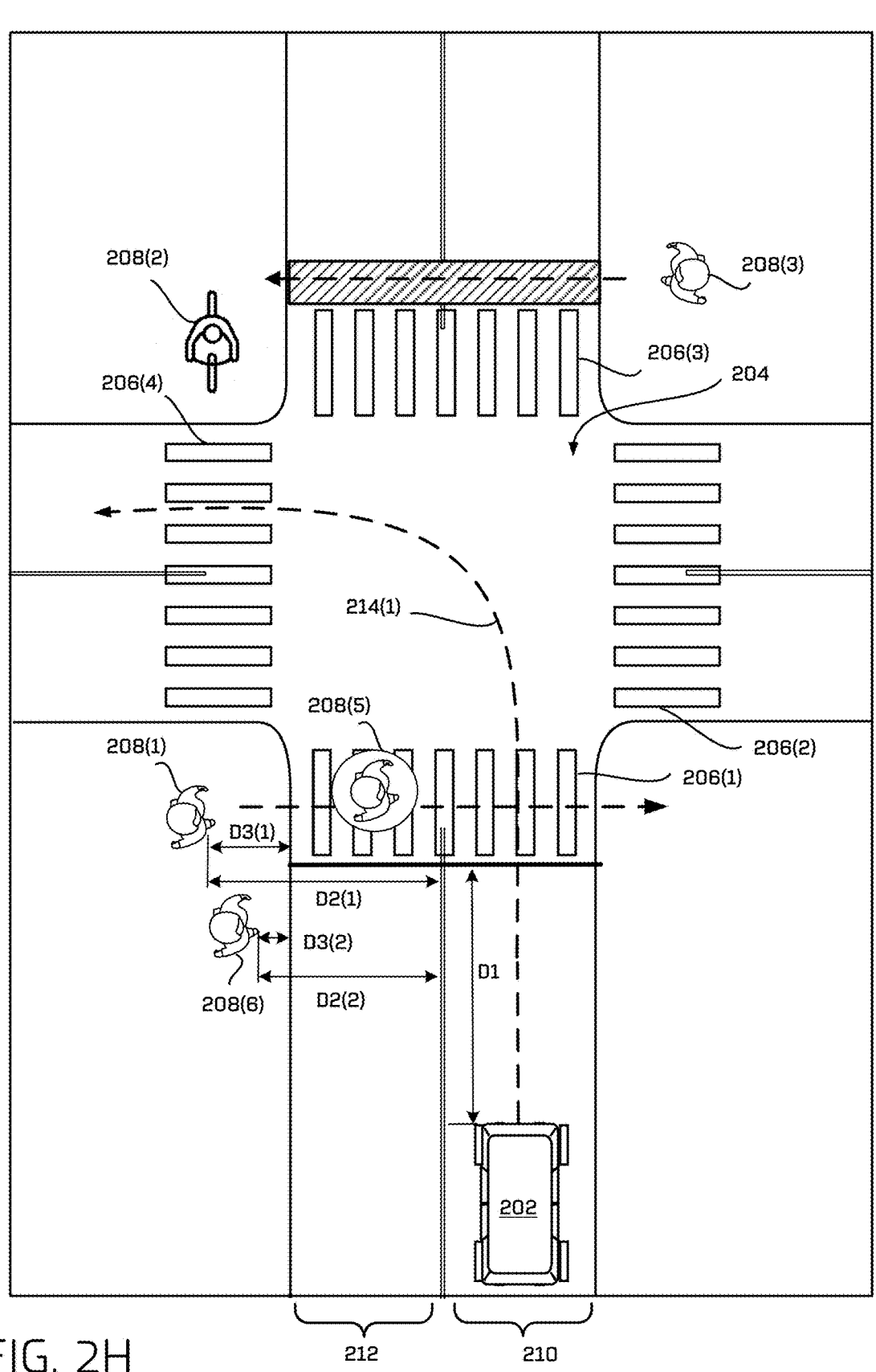
FIG. 2H illustrates an example scenario regarding how to calculate a cost associated with a crosswalk where there are multiple objects close to a crosswalk or inside the crosswalk.

FIG. 2H illustrates an example scenario regarding how to calculate a cost associated with a crosswalk 206(1) where there are multiple objects (e.g., 208 (1), 208(5), and 208(6)) close to a crosswalk 206(1) or inside the crosswalk 206(1). In some instances, multiple objects (e.g., 208 (1) and 208(6)) can be within a threshold distance (e.g., 1 m, 3 m, etc.) to the crosswalk 206(1) or inside (e.g., 208(5)) the crosswalk 206(1). In some examples, the computing system of the vehicle 202 can calculate different costs for different objects (e.g., 208 (1), 208(5), and 208(6)), and select the highest cost as the cost associated with the crosswalk 206(1).

For example, for an individual object 208(1), the computing system of the vehicle 202 can calculate the vehicle velocity (Factor 1), a first distance D1 of the vehicle 202 to a boundary of the first crosswalk 206(1) (Factor 2), a second distance D2(1) of the object 208(1) to a boundary of the first crosswalk 206(1) in the current lane 210 in which the vehicle 202 is operating (Factor 3), and a third distance D3(1) of the object 208(1) to a boundary of the first crosswalk 206(1) in the related lane 212 (Factor 4). In some examples, the computing system of the vehicle 202 can calculate a first cost based on weights of the above four factors associated with individual object 208(1).

For another individual object 208(6), the computing system of the vehicle 202 can calculate a second distance D2(2) of the object 208(2) to a boundary of the first crosswalk 206(1) in the current lane 210 in which the vehicle 202 is operating (Factor 3), and a third distance D3(2) of the object 208(6) to a boundary of the first crosswalk 206(1) in the related lane 212 (Factor 4). Factor 1 and Factor 2 are the same as those calculated for individual object 208(1). In some examples, the computing system of the vehicle 202 can calculate a second cost based on weights of the above four factors associated with individual object 208(6).

The same calculation can be repeated for another individual object 208(5), and the computing system of the vehicle 202 can calculate a third cost based on weights of the four factors associated with individual object 208(6). Then, the computing system of the vehicle 202 can select the highest among the first cost, the second cost, and the third cost as the cost associated with the crosswalk 206(1).

FIG. 3A-FIG. 3D illustrate example factors and corresponding weights that can be used to calculate the cost associated with the crosswalk. As described above, the cost can be the multiplication of four factors (i.e., Factor 1, Factor 2, Factor 3, and Factor 4). It should be understood that these factors are exemplary rather than limiting, and the cost can be determined by alternative factors and/or additional factors.

Figures 3A, 3B:
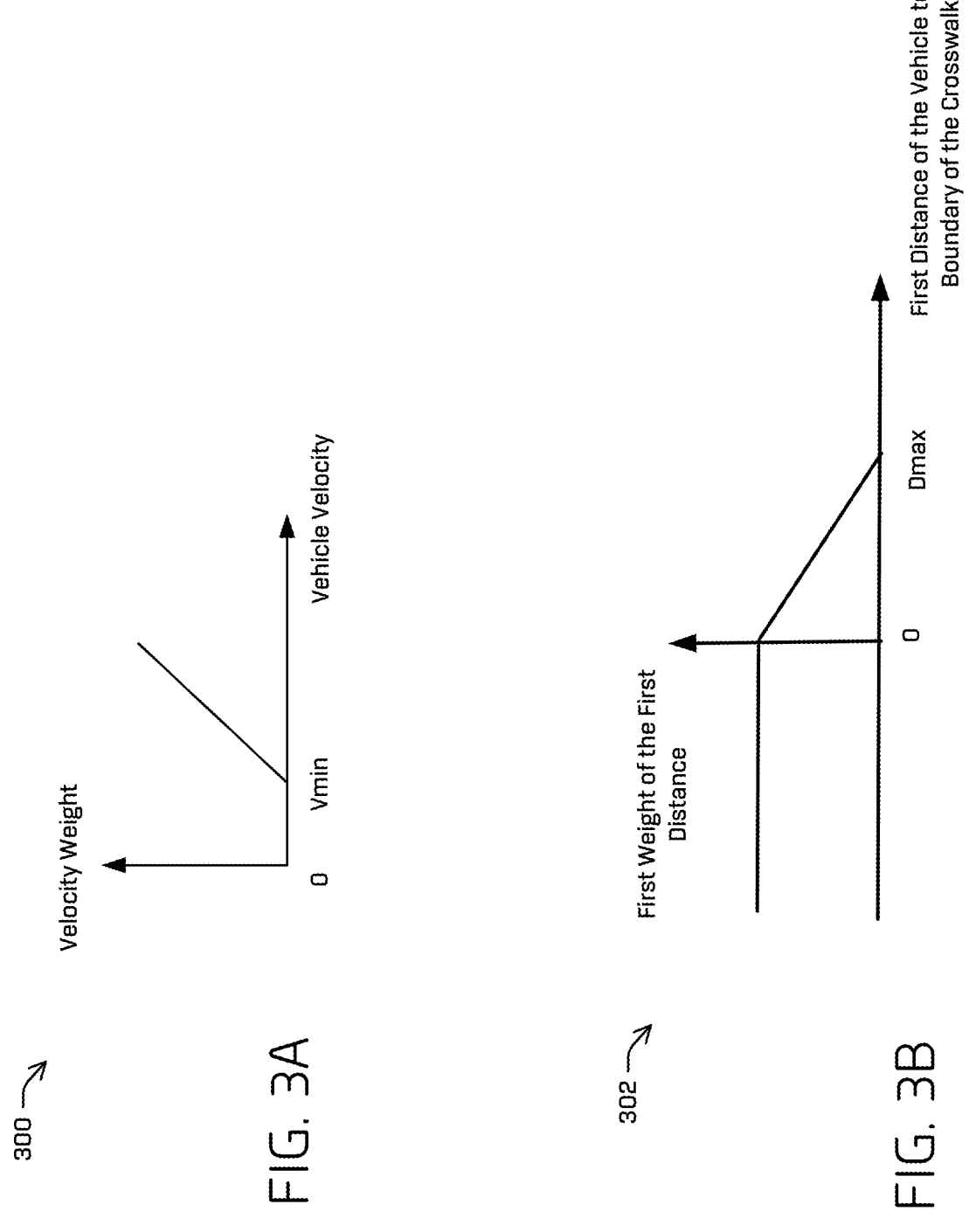
FIG. 3A illustrates a plot of the vehicle velocity versus the velocity weight in calculating the cost associated with a crosswalk in an environment for the vehicle to operate.
FIG. 3B illustrates a plot of the first distance of the vehicle to a first boundary of the crosswalk versus the first weight of the first distance in calculating the cost associated with a crosswalk in an environment for the vehicle to operate.

FIG. 3A illustrates a plot 300 of the vehicle velocity (Factor 1) versus the velocity weight in calculating the cost associated with a crosswalk in an environment for the vehicle to operate. In FIG. 3A, the horizontal axis represents the vehicle velocity, and the vertical axis represents the velocity weight. The relationship between the vehicle velocity and the velocity weight can be represented by equation (1):

$$f(x) = \begin{cases} k(x - v_{min}), & x \geq v_{min} \\ 0, & \text{otherwise} \end{cases} \quad (1)$$

In equation (1), f(x) represents the velocity weight; x represents the vehicle velocity; k represents the proportional factor between the velocity weight and the velocity weight; $v_{min}$ represents a minimum vehicle velocity to impact the cost. In some examples, $v_{min}$ and k can be determined arbitrarily, based on experts' experience, or the like. For example, $v_{min}$ can be 3 m/second, and k can be 1. It should be understood that such numbers are illustrating rather than limiting, and the values of $v_{min}$ and k can be other numbers.

In some instances, when the vehicle is operating at a velocity lower than the minimum velocity $v_{min}$, the weight of the velocity can be zero, and thus the cost is zero. On the other hand, the cost is greater than 0 when the vehicle is operating at a relatively high velocity, for example, greater than the minimum velocity $v_{min}$. As is shown in the plot 300, when the vehicle velocity is higher, the velocity weight is higher, and thus the cost is higher.

FIG. 3B illustrates a plot 302 of the first distance of the vehicle to a first boundary of the crosswalk (Factor 2) versus the first weight of the first distance in calculating the cost associated with a crosswalk in an environment for the vehicle to operate. In FIG. 3B, the horizontal axis represents the first distance of the vehicle to a first boundary of the crosswalk, and the vertical axis represents the first weight of the first distance. The relationship between the first distance and the first weight can be represented by equation (2):

$$f(x) = \begin{cases} 0, & x > d_{max} \\ -kx + b, & d_{max} \geq x > 0 \\ b, & 0 \geq x \end{cases} \quad (2)$$

In equation (2), f(x) represents the first weight of the first distance; x represents the first distance of the vehicle to a first boundary of the crosswalk; k represents the proportional factor between the first distance and the first weight, b represents a weight when the first distance is 0; $d_{max}$ represents a maximum distance of the vehicle to impact the cost. In some examples, $d_{max}$, k, and b can be determined arbitrarily, based on experts' experience, based on criteria, or the like. For example, $d_{max}$ can be 5 m, b can be 2, and k can be 0.2. It should be understood that such numbers are illustrating rather than limiting, and the values of $d_{max}$, k, and b can be other numbers.

In some instances, when the vehicle is operating at a distance far away from the crosswalk, such as greater than $d_{max}$, the first weight of the first distance can be zero, and thus the cost is zero. On the other hand, the cost is greater than 0 when the vehicle is operating at a relatively short distance to the crosswalk, for example, shorter than $d_{max}$. As is shown in the plot 300, when the smaller the first distance is (i.e., the closer the vehicle is to the crosswalk), the higher the first weight of the first distance is, and thus the cost is higher.

Figures 3C, 3D:
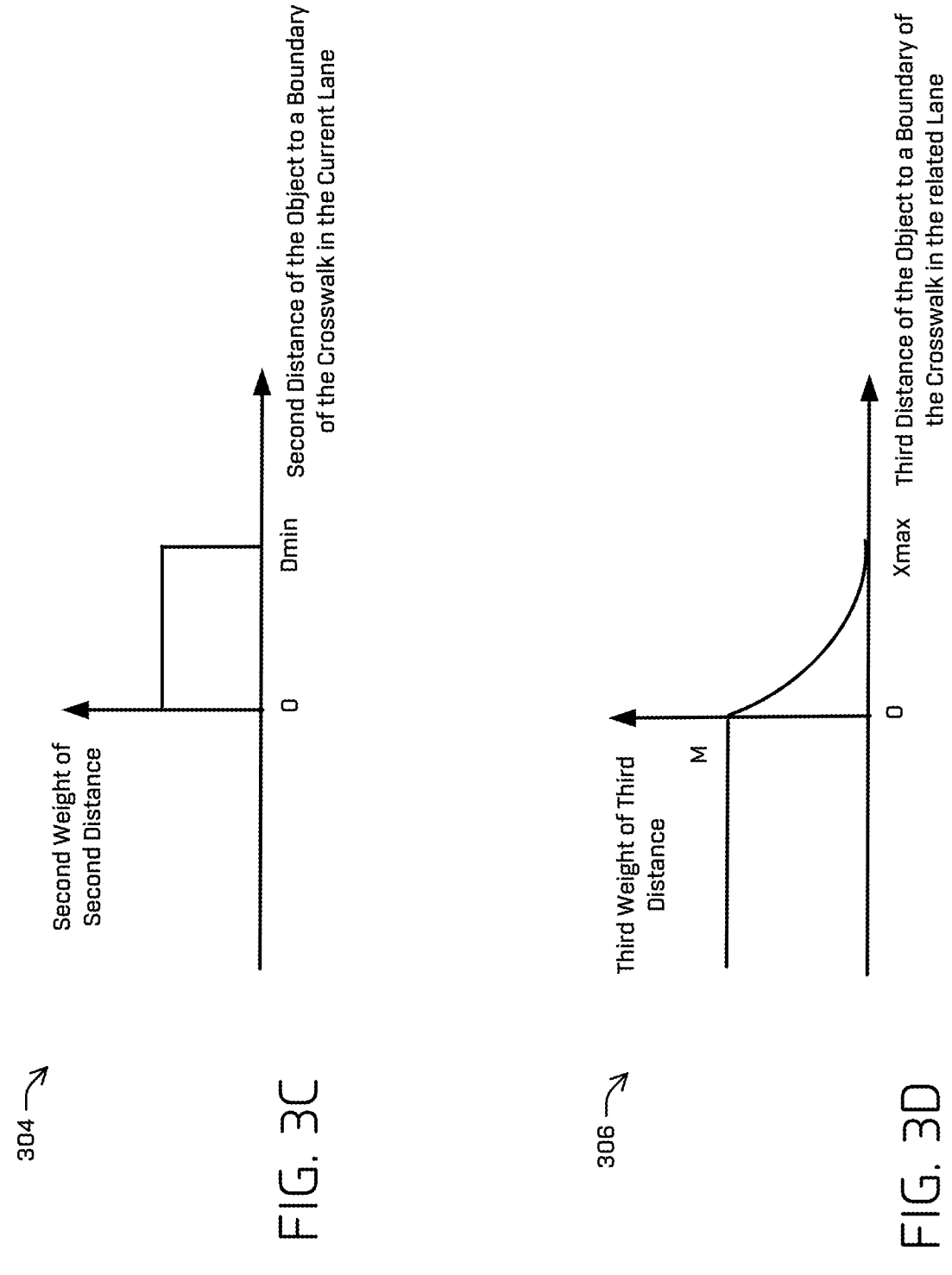
FIG. 3C illustrates a plot of the second distance of the object to a boundary of the crosswalk in the current lane versus the second weight of the second distance in calculating the cost associated with a crosswalk in an environment for the vehicle to operate.
FIG. 3D illustrates a plot of the third distance of the object to a boundary of the crosswalk in a related lane versus the third weight of the third distance in calculating the cost associated with a crosswalk in an environment for the vehicle to operate.

FIG. 3C illustrates a plot 304 of the second distance of the object to a boundary of the crosswalk in the current lane (Factor 3) versus the second weight of the second distance in calculating the cost associated with a crosswalk in an environment for the vehicle to operate. In FIG. 3C, the horizontal axis represents the second distance of the object to a boundary of the crosswalk in the current lane in which the vehicle is operating, and the vertical axis represents the second weight of the second distance. The relationship between the second distance and the second weight can be represented by equation (3):

$$f(x) = \begin{cases} C, & x < d_{min} \\ 0, & \text{otherwise} \end{cases} \quad (3)$$

In equation (3), f(x) represents the second weight of the second distance; x represents the second distance of the object to a boundary of the crosswalk in the current lane; k represents the proportional factor between the second distance and the second weight; C represents a constant second weight of the second distance, $d_{min}$ represents a minimum distance of the object to a boundary of the crosswalk in the current lane to impact the cost. In some examples, C and $d_{min}$ can be determined arbitrarily, based on experts' experience, based on criteria, or the like. For example, C can be 1.0, and $d_{min}$ can be 3 m. It should be understood that these numbers are illustrating rather than limiting, and the values of C and $d_{min}$ can be other numbers.

In some instances, when the object is within the minimum distance $d_{min}$ to the crosswalk in the current lane in which the vehicle is operating, the second weight of the second distance can be the same (e.g., C). Additionally or alternatively, the second weight of the second distance can be a function of x instead of being a constant when the second distance is below $d_{min}$. On the other hand, when the object is far away from the crosswalk in the current lane (i.e., the second distance is greater than $d_{min}$), the second weight of the second distance is zero, and thus the cost is zero.

FIG. 3D illustrates a plot 306 of the third distance of the object to a boundary of the crosswalk in a related lane (Factor 4) versus the third weight of the third distance in calculating the cost associated with a crosswalk in an environment for the vehicle to operate. In FIG. 3D, the horizontal axis represents third distance of the object to a boundary of the crosswalk in a related lane, and the vertical axis represents the third weight of the third distance. The relationship between the third distance and the third weight can be represented by equation (4):

$$f(x) = \begin{cases} M, & x < 0 \\ \left(1 - \dfrac{x}{x_{max}}\right)^2, & 0 \leq x < x_{max} \\ 0, & x_{max} \leq x \end{cases} \quad (4)$$

In equation (4), f(x) represents the third weight of the third distance; x represents the third distance of the object to a boundary of the crosswalk in the related lane; $x_{max}$ represents the maximum of the second distance that can impact the cost; M represents a third weight of the third distance when the third distance is equal to or less than 0. In some examples, M and $x_{max}$ can be determined arbitrarily, based on experts' experience, based on criteria, or the like. For example, M can be 1.0, and $x_{max}$ can be 3 m. It should be understood that these numbers are illustrating rather than limiting, and the values of M and $x_{max}$ can be other numbers.

In some instances, the third distance of the object to a boundary of the crosswalk in the related lane can be a direct contributor to the cost of the crosswalk. When the object is within the maximum distance $x_{max}$ to the crosswalk in the related lane, the shorter the third distance, the higher the cost. On the other hand, when the object is far away from the crosswalk in the related lane (i.e., the third distance is greater than the maximum distance $x_{max}$), the third weight of the third distance is zero, and thus the cost is zero. In some instances, the difference between the second distance (i.e., the distance of the object to a boundary of the crosswalk in the current lane) and the third distance (i.e., the distance of the object to a boundary of the crosswalk in a related lane) can be that the object might be relatively close to the crosswalk in the related lane, but still far away from the current lane. In such a case, the third weight of the third distance decreases quickly as the third distance increases, such that the cost is not affected heavily by the third distance, and the vehicle can pass through the crosswalk without too much caution. On the other hand, if the object is close to the crosswalk in the current lane in which the vehicle is operating, there is a strong indication that the object may cross the crosswalk. Thus, the second weight of the second distance does not decrease as the second distance increases as long as the second distance is within $d_{min}$.

FIG. 3A-FIG. 3D illustrate Factor 1, Factor 2, Factor 3, and Factor 4 and corresponding weights which can be used to calculate the cost associated with the crosswalk. In some instances, the cost of the crosswalk can be related to the presence of the object. For example, when there are no objects close to the crosswalk, the cost of the crosswalk can be 0. In some instances, the heatmaps (which represent the distances to the crosswalks or the driving surfaces) can be precomputed (before calculating the weights of the factors), allowing the vehicle to explore the entire space quickly and efficiently in the optimization scheme.

In some instances, the cost can be determined further based on the type and/or characteristics of the object. For example, different types of objects (e.g., a pedestrian, a bicycle, a pedestrian with a baby stroller, a wheeled pedestrian, a pedestrian with a shopping cart, etc.) can have different costs. In some examples, the wheeled pedestrian may refer to a pedestrian with a wheeled transporters such as a wheelchair, a scooter, a skateboard, a Segway, etc. In some instances, the cost calculation can be further based on the moving direction of the object. For example, an object moving toward the vehicle can have a higher cost, while an object moving away from the vehicle can have a lower cost.

In some instances, when planning the path for the vehicle, the planning system of the vehicle can use the cost associated with the crosswalk with or without a control policy. For example, a control policy can be formulated to achieve the effect of a caution reaction or a stop reaction for the vehicle. As an example of a caution reaction, the control policy can require the vehicle to slow down when the vehicle is within a threshold distance to a crosswalk through which an object has an intent to cross the road. As an example of a stop reaction, the control policy can require the vehicle to stop completely before the crosswalk if there is a prediction that the vehicle is likely to interact with or impact the object in the crosswalk.

Figure 4:
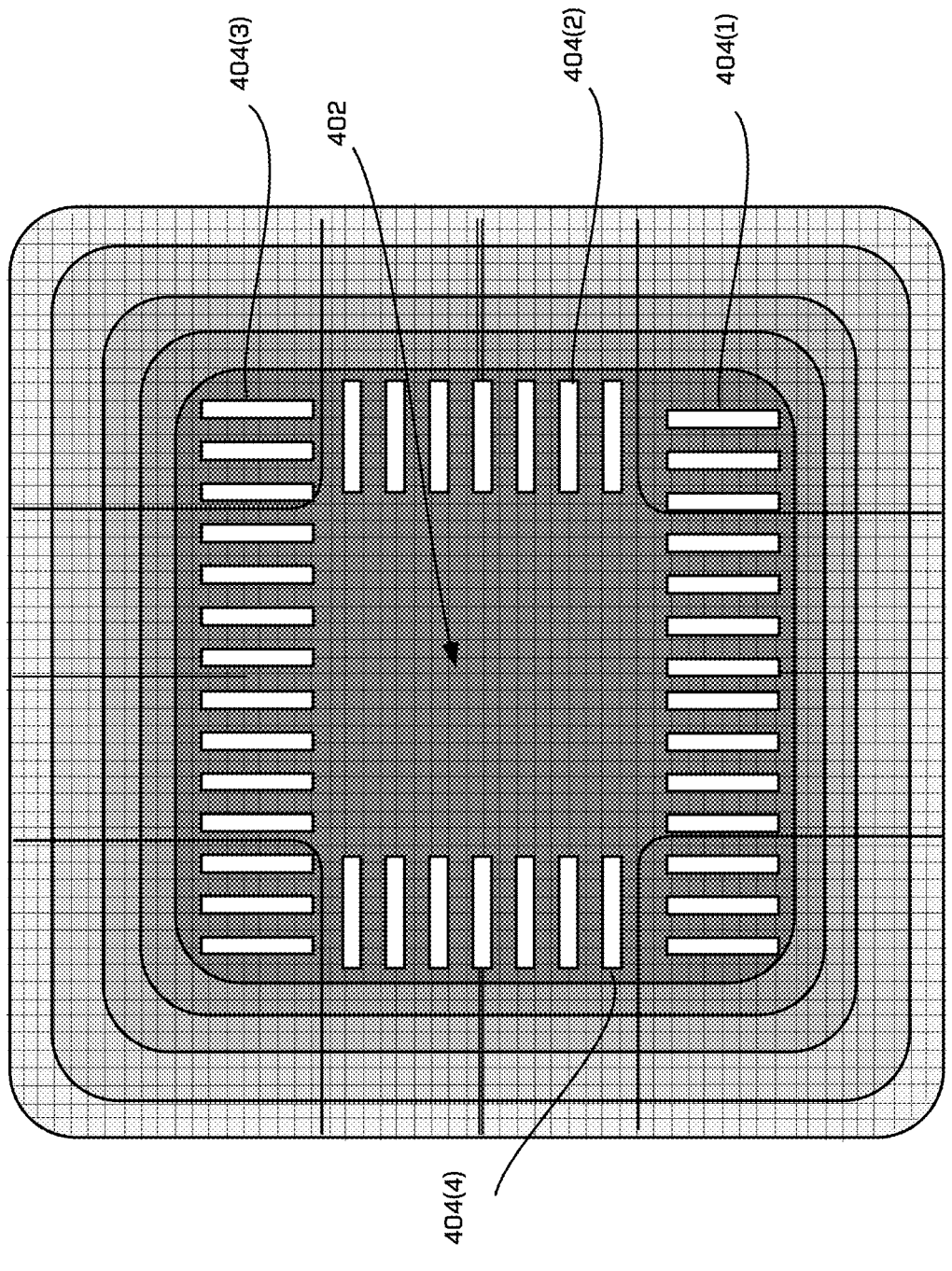
FIG. 4 illustrates an example distance heatmap representing distances of crosswalks from a center of a junction in an environment for an autonomous vehicle to operate.

FIG. 4 illustrates an example distance heatmap 400 representing distances of crosswalks from a center of a junction 402 in an environment for an autonomous vehicle to operate. In some instances, the distance heatmap 400 can be generated based on sensor data captured by sensors mounted on the autonomous vehicle.

In this example, the junction 402 includes four crosswalks 404(1), 404(2), 404(3), and 404(4). The distance heatmap 400 can include a 2D array of cells, each of which can represent an approximation of a distance of the nearest crosswalk to the center of the junction 402. In this example, the distance heatmap 400 uses the center of the junction 402 as a reference to calculate the distance of the nearest crosswalk. Additionally or alternatively, the distance heatmap 400 can use other locations or positions as the reference, for example, the location of the vehicle, the location of the object, etc. In this example, the distance heatmap 400 uses different grey scales to represent different values, indicating how far away a crosswalk is with respect to the center of the junction 402. Additionally or alternatively, the distance heatmap 400 can use different colors to represent different values. Note that the distance heatmap 400 is a simplified version for illustration purposes. In some examples, the distance heatmap 400 can include more details.

In some examples, the distance heatmap 400 can be used as input for the cost calculation of the crosswalk as described herein. In some examples, the cost associated with the crosswalk can be used by the planning system of the autonomous vehicle to conduct a tree search to determine a trajectory for the autonomous vehicle. In some instances, a computing system of the autonomous vehicle can use the distance heatmap 400 to obtain distances to all crosswalks (404(1)-404(2)) in the junction 402, even if the crosswalk is not on the route of the autonomous vehicle. Compared to a heatmap that can only provide a distance to one crosswalk on the trajectory of the vehicle, such a distance heatmap 400 can be advantageous, because the planning component of the autonomous vehicle can plan in advance for the vehicle with the information of all crosswalks (404(1)-404(2)) in the junction 402. Moreover, the distance heatmap 400 can provide information on a region for the autonomous vehicle, rather than merely providing information along the route of the autonomous vehicle.

In some instances, the heatmap can be calculated once, and can be reused when the state of the object and/or the state of the vehicle changes over time. For example, as shown in FIG. 4, the heatmap can be calculated once for all the crosswalks in the junction. When the vehicle approaches the first crosswalk 404(1), the planning component of the computing system of the vehicle can calculate a cost associated with the first crosswalk 404(1) based on the heatmap 400. When the vehicle passes the first crosswalk 404(1) and approaches the third crosswalk 404(3), the planning component of the computing system of the vehicle can calculate a cost associated with the third crosswalk 404(3) based on the same heatmap 400. As such, the heatmap 400 allows the vehicle to explore the entire space quickly and efficiently in the optimization scheme. Additionally, or alternatively, such computations may be performed offline (e.g., at a remote computing system or at a previous time on the vehicle) and accessed by the vehicle upon reaching the particular crosswalk.

FIGS. 5A-5J illustrate various example scenarios where an autonomous vehicle makes a reaction to a crosswalk with an object in an environment based on the cost associated with the crosswalk.

Figure 5B:
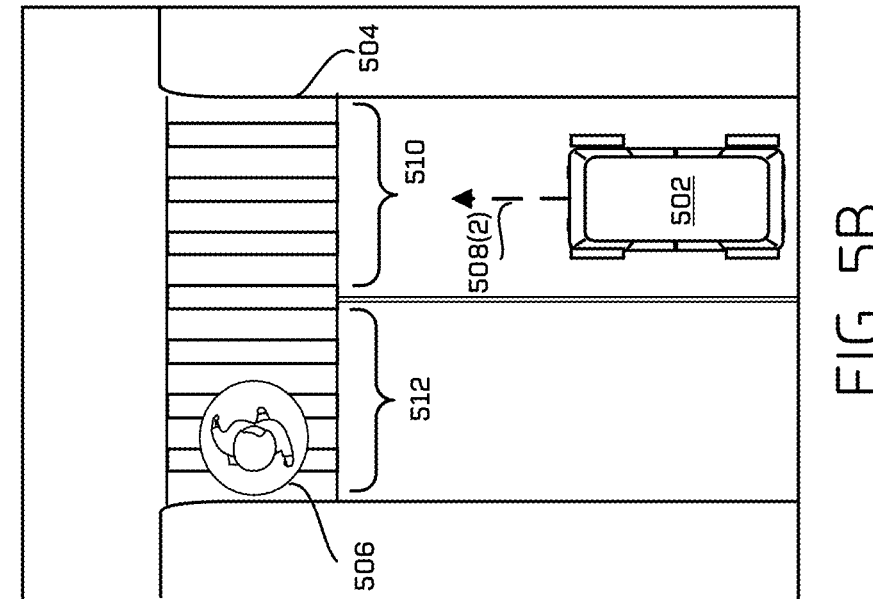
FIG. 5B illustrates an example scenario where the autonomous vehicle is approaching the crosswalk with the object located inside the crosswalk and stationary in the environment.
Figure 5A:
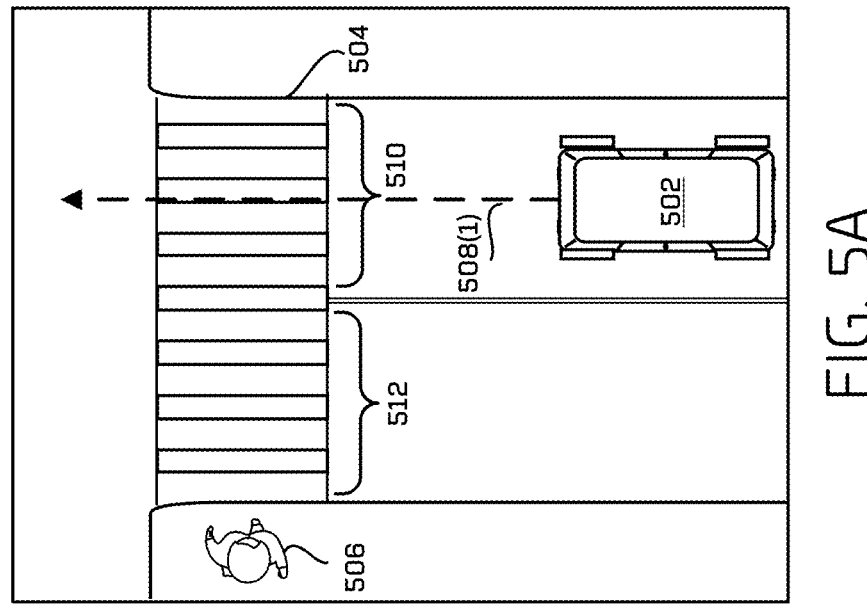
FIG. 5A illustrates an example scenario where the autonomous vehicle is approaching a crosswalk with an object located outside the crosswalk in an environment.

FIG. 5A illustrates an example scenario 500 where the autonomous vehicle 502 is approaching a crosswalk 504 with an object 506 located outside the crosswalk 504 in an environment. In some examples, the object 506 may include a pedestrian, a cyclist, an animal, a wheeled pedestrian, etc. In this example, the autonomous vehicle 502 can detect the presence of the crosswalk 504 and the object 506 close to the crosswalk 504 based on sensor data collected by sensors equipped on the autonomous vehicle 502. In some instances, the autonomous vehicle 502 can determine that the object 506 is located outside the crosswalk 504 and stationary based on the sensor data. The autonomous vehicle 502 can also determine the velocity of the autonomous vehicle 502 (Factor 1), a first distance of the autonomous vehicle 502 to a boundary of the crosswalk 504 (Factor 2), a second distance of the object 506 to a boundary of the crosswalk 504 a current lane 510 in which the autonomous vehicle 502 is operating (Factor 3), a third distance of the object 506 to a boundary of the crosswalk 504 in a related lane 512 (Factor 4). The planning system of the autonomous vehicle 502 can determine a cost associated with the crosswalk 504 based on the cost calculation methods described throughout this disclosure. In some examples, the cost associated with the crosswalk 504 can be the multiplication of the above four factors. Note that these factors are exemplary rather than limiting. Such factors are optional and can be replaced by other factors. Moreover, additional factors can be used to determine the cost associated with the crosswalk.

In the scenario 500, because the object 506 is outside the crosswalk 504 and stationary, the cost associated with the crosswalk 504 can be zero or relatively low. The planning component of the autonomous vehicle 502 can plan a trajectory 508(1) for the autonomous vehicle 502 based on the cost such that the autonomous vehicle 502 can take caution while approaching the crosswalk 504 without stopping completely.

FIG. 5B illustrates an example scenario 514 where the autonomous vehicle 502 is approaching the crosswalk 504 with the object 506 located inside the crosswalk 504 and stationary in the environment. In the scenario 514, because the object 506 is already inside the crosswalk 504, the cost associated with the crosswalk 504 can be relatively high. The planning component of the autonomous vehicle 502 can plan a trajectory 508(2) based on the cost for the autonomous vehicle 502 such that the autonomous vehicle 502 can take a yield action when approaching the crosswalk 504. The yield action may refer to an action taken by a vehicle to let other road users (such as another vehicle, pedestrian, cyclist, or the like) proceed before the vehicle, giving the right-of-way to other road users. The yield action can be performed by the vehicle at intersections, junctions, roundabouts, or when merging into traffic, ensuring smooth and safe driving behavior by prioritizing pedestrians or other road users based on traffic rules or courtesy. In some instances, when the object 506 in the crosswalk is stationary without moving, without blocking the trajectory of the autonomous vehicle 502, the autonomous vehicle 502 can hold the yield action for a period of time before moving forward with a relatively low velocity.

Figure 5D:
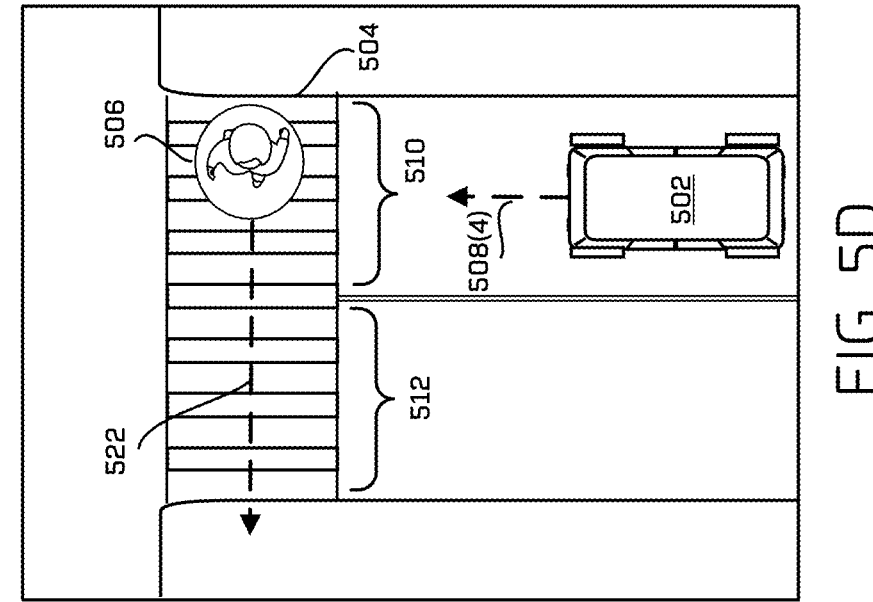
FIG. 5D illustrates an example scenario where the autonomous vehicle is approaching the crosswalk with the object located inside the crosswalk in the current lane (on the "vehicle side") and moving along a trajectory through the crosswalk in the environment.
Figure 5C:
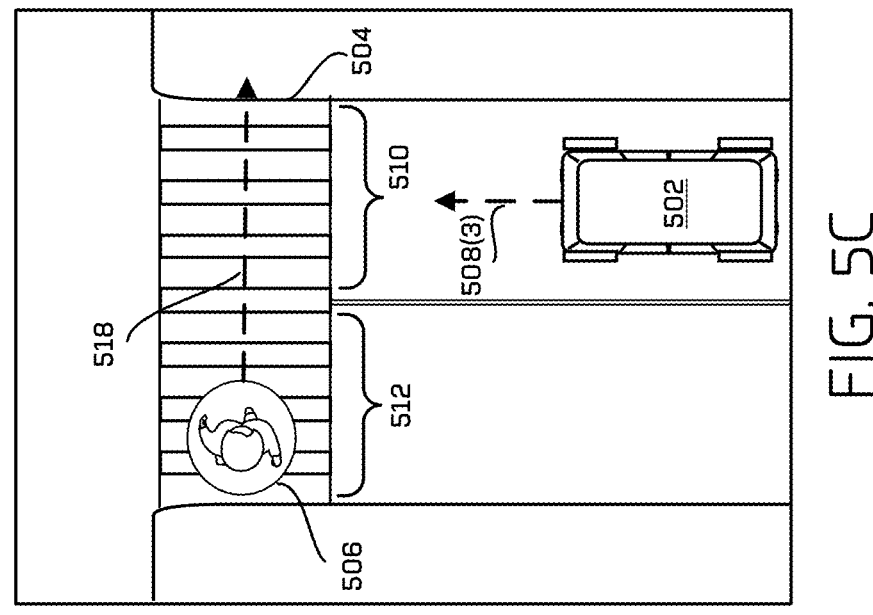
FIG. 5C illustrates an example scenario where the autonomous vehicle is approaching the crosswalk with the object located inside the crosswalk in the related lane (on the "far side") and moving along a trajectory through the crosswalk in the environment.

FIG. 5C illustrates an example scenario 516 where the autonomous vehicle 502 is approaching the crosswalk 504 with the object 506 located inside the crosswalk 504 in the related lane 512 (on the "far side") and moving along a trajectory 518 through the crosswalk 504 in the environment. In the scenario 516, because the object 506 is inside the crosswalk 504 and moving, the cost associated with the crosswalk 504 can be relatively high. The planning component of the autonomous vehicle 502 can plan a trajectory 508(3) based on the cost for the autonomous vehicle 502 such that the autonomous vehicle 502 can yield to the object 506 because the object 506 has the right of way. The autonomous vehicle 502 may wait until the object 506 has moved outside the current lane 510 to continue moving forward.

FIG. 5D illustrates an example scenario 520 where the autonomous vehicle 502 is approaching the crosswalk 504 with the object 506 located inside the crosswalk 504 in the current lane 510 (on the "vehicle side") and moving along a trajectory 522 through the crosswalk 504 in the environment. In the scenario 520, because the object 506 is inside the crosswalk 504 and moving, the cost associated with the crosswalk 504 can be relatively high. The difference between FIG. 5D and FIG. 5C may lie in that the cost associated with the crosswalk 504 is different because the object 506 is in the current lane 510 rather than the related lane 512. In the scenario 520, the planning component of the autonomous vehicle 502 can plan a trajectory 508(4) based on the cost for the autonomous vehicle 502 such that the autonomous vehicle 502 can yield to the object 506 because the object 506 has the right of way. The autonomous vehicle 502 may wait until the object 506 has moved outside the related lane 512 to continue moving forward.

In the above scenarios depicted in FIG. 5C and FIG. 5D, the trajectory 508(3) and the trajectory 508(4) can include instructions and/or actions for the autonomous vehicle 502 to take. For example, the actions can include information about a desired deceleration of the autonomous vehicle 502, a desired velocity of the autonomous vehicle, a desired stopping position of the autonomous vehicle 502, or the like. In some examples, the actions for the autonomous vehicle 502 to take cause the autonomous vehicle 502 avoid entering the crosswalk 504 in a crossable state with an object 506 crossing the road (on the far side or the vehicle side), unless the autonomous vehicle 502 is unable to stop prior to entering the crosswalk 504 with the desired deceleration.

Figure 5F:
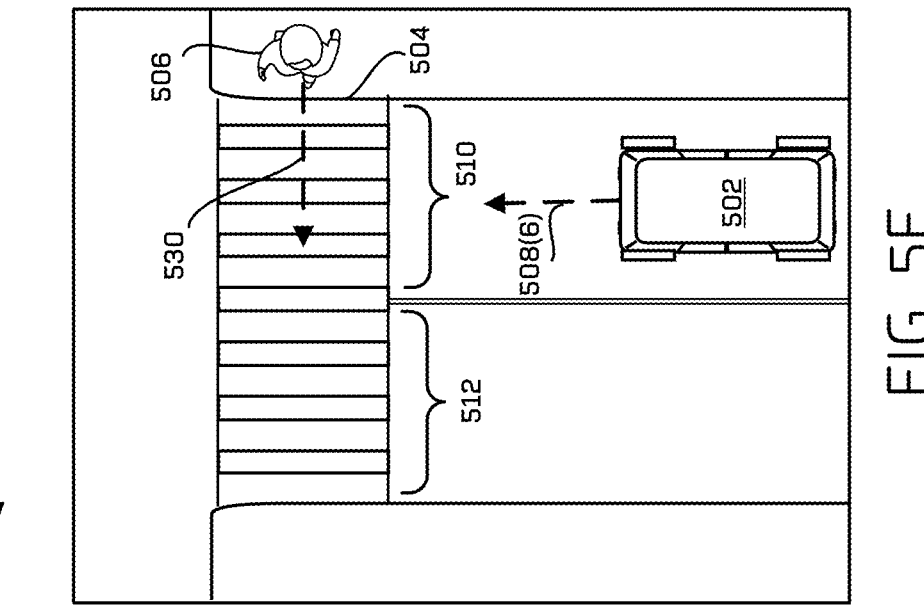
FIG. 5F illustrates an example scenario where the autonomous vehicle is approaching the crosswalk with the object located outside the crosswalk in the current lane and starting to move along a trajectory through the crosswalk in the environment.
Figure 5E:
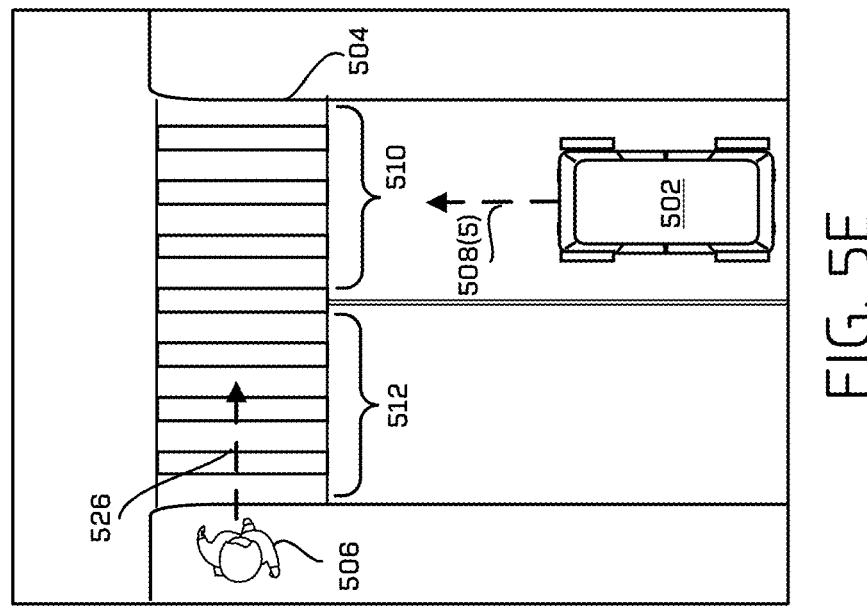
FIG. 5E illustrates an example scenario where the autonomous vehicle is approaching the crosswalk with the object located outside the crosswalk in the related lane and starting to move along a trajectory through the crosswalk in the environment.

FIG. 5E illustrates an example scenario 524 where the autonomous vehicle 502 is approaching the crosswalk 504 with the object 506 located outside the crosswalk 504 in the related lane 512 and starting to move along a trajectory 526 through the crosswalk 504 in the environment. In the scenario 524, because the object 506 starting to move along a trajectory 526 through the crosswalk 504, the cost associated with the crosswalk 504 can be relatively high. The planning component of the autonomous vehicle 502 can plan a trajectory 508(5) based on the cost for the autonomous vehicle 502 such that the autonomous vehicle 502 can yield to the object 506 because the object 506 has the right of way. The autonomous vehicle 502 may wait until the object 506 has moved outside the current lane 510 to continue moving forward.

FIG. 5F illustrates an example scenario 528 where the autonomous vehicle 502 is approaching the crosswalk 504 with the object 506 located outside the crosswalk 504 in the current lane 510 and starting to move along a trajectory 530 through the crosswalk 504 in the environment. In the scenario 524, because the object 506 starting to move along a trajectory 530 through the crosswalk 504, the cost associated with the crosswalk 504 can be relatively high. The difference between FIG. 5E and FIG. 5F may lie in that the cost associated with the crosswalk 504 is different because the object 506 is in the current lane 510 rather than the related lane 512. The planning component of the autonomous vehicle 502 can plan a trajectory 508(6) based on the cost for the autonomous vehicle 502 such that the autonomous vehicle 502 can yield to the object 506 because the object 506 has the right of way. The autonomous vehicle 502 may wait until the object 506 has moved outside the related lane 512 to continue moving forward.

In the above scenarios depicted in FIG. 5E and FIG. 5F, the trajectory 508(5) and the trajectory 508(6) can include instructions and/or actions for the autonomous vehicle 502 to take. For example, the actions can include information about a desired deceleration of the autonomous vehicle 502, a desired velocity of the autonomous vehicle, a desired stopping position of the autonomous vehicle 502, or the like. The autonomous vehicle 502 may stop before the crosswalk 504 and let the object 506 cross the road. In some cases, when the desired deceleration and the desired velocity of autonomous vehicle 502 may allow the autonomous vehicle 502 to stop prior to entering the crosswalk 504. The autonomous vehicle 502 can stop at a desired stopping that allows the object 506 to cross the road without leaving the crosswalk 504. For example, the desired stopping position of the autonomous vehicle 502 can be a position before crosswalk 504 where the front axle of the autonomous vehicle 502 is outside the boundary of the crosswalk 504.

In some instances, when the autonomous vehicle 502 is already inside the crosswalk 504 and the object 506 suddenly started to move, the autonomous vehicle 502 cannot stop immediately, then the autonomous vehicle 502 may slow down until passes the crosswalk 504. In the case that the object 506 begins crossing the road when the autonomous vehicle 502 is in a position the autonomous vehicle 502 can no longer stop comfortably before entering the crosswalk 504, the autonomous vehicle 502 can travel below a desired velocity until passes the crosswalk 504.

Figure 5G:
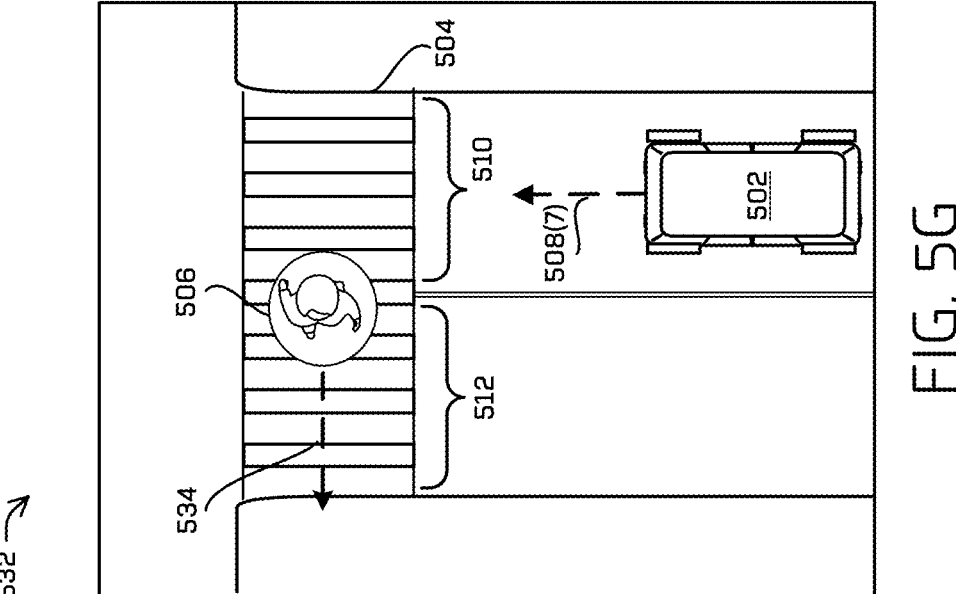
FIG. 5G illustrates an example scenario where the autonomous vehicle is approaching the crosswalk with the object located inside the crosswalk leaving the current lane and moving along a trajectory through the crosswalk in the environment.

FIG. 5G illustrates an example scenario 532 where the autonomous vehicle 502 is approaching the crosswalk 504 with the object 506 located inside the crosswalk 504 leaving the current lane 510 and moving along a trajectory 534 through the crosswalk 504 in the environment. In the scenario 532, because the object 506 is moving in a direction away from the current lane 510, the cost associated with the crosswalk 504 can be relatively low. The planning component of the autonomous vehicle 502 can plan a trajectory 508(6) based on the cost for the autonomous vehicle 502 such that the autonomous vehicle 502 can slow down or pass the crosswalk 504 with caution. Additionally or alternatively, the autonomous vehicle 502 may wait until the object 506 has moved outside the related lane 512 to move forward.

Figures 5H, 5I, 5J:
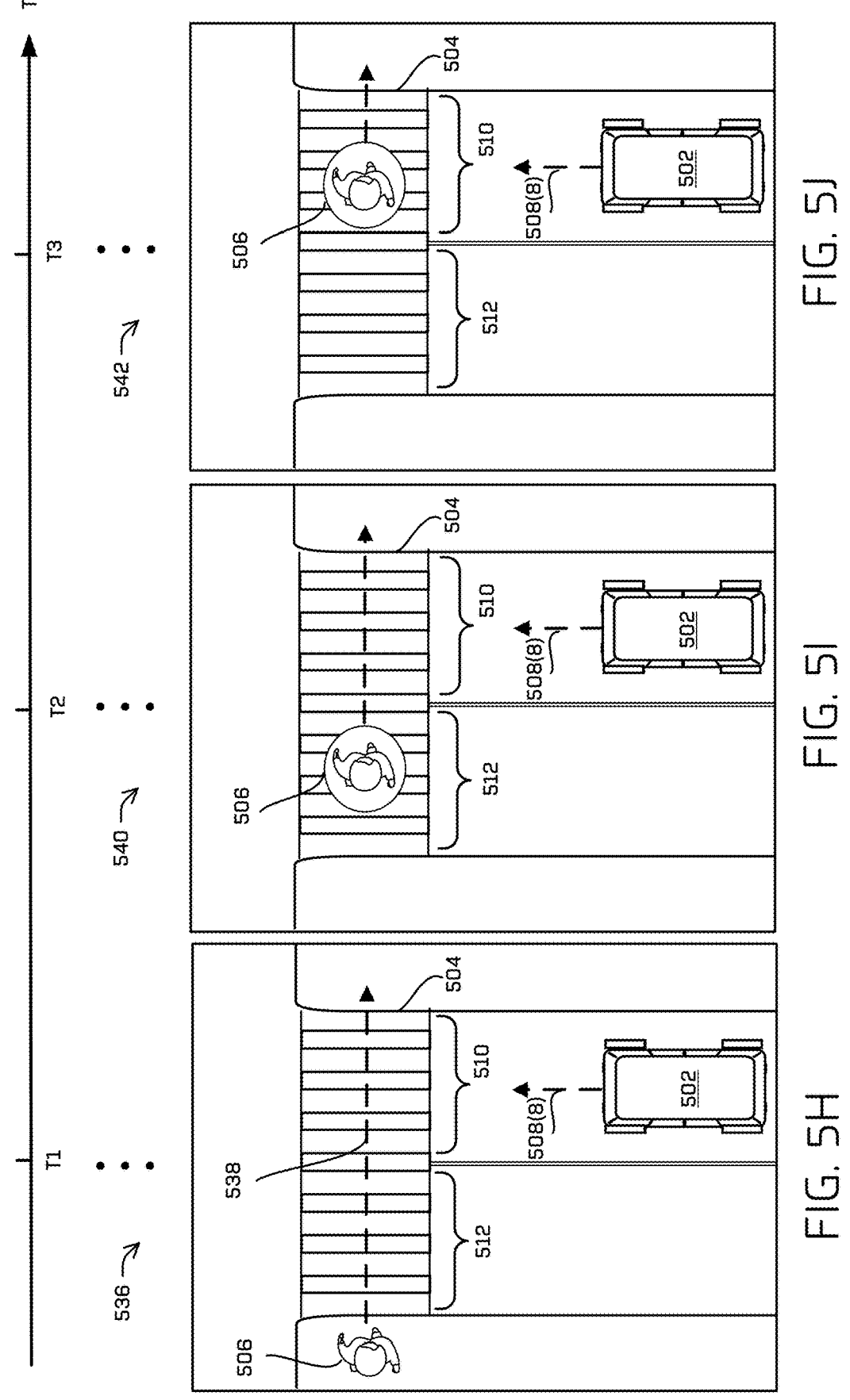
FIG. 5H illustrates an example scenario at a time point t1 where the object is located outside the crosswalk on the far side, moving along the trajectory through the crosswalk.
FIG. 5I illustrates an example scenario at a time point t2 where the object is located inside the crosswalk in the related lane, moving along the trajectory through the crosswalk.
FIG. 5J illustrates an example scenario at a time point t3 where the object is located inside the crosswalk in the current lane, moving along the trajectory through the crosswalk.

FIGS. 5H-5J illustrate a series of example scenarios where the autonomous vehicle 502 is approaching the crosswalk 504 with the object 506 moving along the trajectory 538 through the crosswalk 504 over time in the environment.

FIG. 5H illustrates an example scenario 536 at a time point t1 where the object 506 is located outside the crosswalk 504 on the far side, moving along the trajectory 538 through the crosswalk 504. In some instances, the planning component of the computing system of the autonomous vehicle 602 can determine a first cost associated with the crosswalk 504 at t1.

FIG. 5I illustrates an example scenario 540 at a time point t2 where the object 506 is located inside the crosswalk 504 in the related lane 512, moving along the trajectory 538 through the crosswalk 504. In some instances, the planning component of the computing system of the autonomous vehicle 602 can determine a second cost associated with the crosswalk 504 at t2.

FIG. 5J illustrates an example scenario 542 at a time point t3 where the object 506 is located inside the crosswalk 504 in the current lane 510, moving along the trajectory 538 through the crosswalk 504. In some instances, the planning component of the computing system of the autonomous vehicle 602 can determine a third cost associated with the crosswalk 504 at t3.

In the example scenarios depicted in FIGS. 5H-5J, the planning component of the computing system of the autonomous vehicle 602 can determine a total cost associated with the crosswalk 504 by summing up the first cost, the second cost, and the third cost. Note that there can be more time points, and more costs calculated over time.

Figure 6:
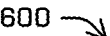
FIG. 6 illustrates an example velocity profile of the autonomous vehicle approaching a crosswalk in the environment.

Alternatively or additionally, a velocity cost of the vehicle can be used by the vehicle to address crosswalk encounters while the vehicle is operating in an environment. FIG. 6 illustrates an example velocity profile 600 of the autonomous vehicle 602 approaching a crosswalk 604. In the velocity profile 600, the horizontal axis can represent a distance Sx, and the vertical axis can represent a velocity v. $s_{start}$ represents a starting point at which the autonomous vehicle 602 starts to take the action. $s_{front}$ represents a position of the front axle of the autonomous vehicle 602 at which the autonomous vehicle 602 may stop. $s_{end}$ represents an endpoint at which the action of the autonomous vehicle 602 ends. $s_1$ represents the first boundary of the crosswalk 604. $s_2$ represents the second boundary of the crosswalk 604. $v_{x\_initial}$ represents the initial velocity of the autonomous vehicle 602 at the starting point. $v_x$ represents the current velocity of the autonomous vehicle 602. $v_{x\_des}$ represents the desired velocity of the autonomous vehicle 602.

In some instances, a velocity profile when the autonomous vehicle 602 is approaching the crosswalk 604 with an object can be defined based on a velocity cost. The velocity cost can be used for tracking the desired velocity of the autonomous vehicle 602. When the current velocity of the autonomous vehicle 602 is greater than desired velocity of the autonomous vehicle 602, the velocity cost can be defined by equation (5), where the desired velocity allows the autonomous vehicle 602 to stop prior to entering the crosswalk 604.

$$\text{cost}_v = \lambda \cdot w \cdot (v_x - v_{x\_des})^2 \qquad (5)$$

In equation (5), $\text{cost}_v$ represents a cost for tracking the desired velocity of the autonomous vehicle 602; $\lambda$ represents a tuning parameter; w represents a caution weight associated with the crosswalk 604; $v_x$ represents a current velocity of the autonomous vehicle 602; $v_{x\_des}$ represents a desired velocity of the autonomous vehicle 602.

In some instances, the caution weight w can be determined based on a lateral distance of the object to a trajectory of the autonomous vehicle 602. The caution weight w can be defined by equation (6).

$$w = \left(1 - \frac{d_{object\_lateral}}{d_{threshold}}\right)^2 \quad d_{object\_lateral} < d_{threshold} \qquad (6)$$

In equation (6), w represents the caution weight; $d_{object\_lateral}$ represents a lateral distance of the object to a trajectory of the autonomous vehicle 602; $d_{threshold}$ represents a threshold distance for the lateral distance.

In some instances, a distance $s_x$ between the current position of the autonomous vehicle, 602 and a boundary associated with the crosswalk 604 can be used for the autonomous vehicle 602 to take an action (e.g., a slowing down action, a yield action, a stopping action, etc.). In some examples, the autonomous vehicle 602 can take constant deceleration motion to slow down before the crosswalk 604. The speed profile is shown below. The desired velocity of the autonomous vehicle 602 can be defined by equation (7) and equation (8).

$$v_{x\_des} = \begin{cases} \sqrt{v_{x\_initial}^2 - A \cdot a \cdot (s_x - s_{start})}, & s_x \in [s_{start}, s_{front}] \\ 0, & s_x \in [s_{front}, s_{end}] \end{cases} \quad (7)$$

$$a = \frac{v_{x\_initial}^2}{2 \cdot (s_{front} - s_{start})} \quad (8)$$

In equation (7) and equation (8), $v_{x\_des}$ represents the desired velocity of the autonomous vehicle 602; $s_x$ represents a distance between the current position of the autonomous vehicle 602 and a boundary associated with the crosswalk 604; $s_{start}$ represents a starting point at which the autonomous vehicle 602 starts to take the action; $s_{front}$ represents a position of the front axle of the autonomous vehicle 602 at which the autonomous vehicle 602 may stop; $s_{end}$ represents an endpoint at which the action of the autonomous vehicle 602 ends; $v_{x\_initial}$ represents the initial velocity of the autonomous vehicle 602 at the starting point; A represents a scalar; a represents a constant deceleration.

Accordingly, the velocity cost can be defined by equation (9):

$$cost_v = \begin{cases} \lambda \cdot w \cdot (v_x - v_{x_{des}})^2, & v_x > v_{x\_des} \\ 0, & \text{otherwise} \end{cases} \quad (9)$$

In some instances, an object may be located outside the boundaries of the crosswalk 604. Thus, techniques discussed herein can add a buffer region next to the boundary of the crosswalk 604, such that when the object is crossing the road outside the crosswalk, the cost associated with the crosswalk 604 will not be 0 or close to 0. For example, a first buffer region B1 can be added next to the first boundary of the crosswalk 604, and a second buffer region B2 can be added next to the second boundary of the crosswalk 604. Therefore, the vehicle can pass through the crosswalk 604 with caution or slow down due to a relatively high value of the cost.

In some examples, when approaching the crosswalk 604, the autonomous vehicle 602 can be controlled based on costs discussed herein without control policies.

On the other hand, the autonomous vehicle 602 can be controlled based on costs discussed herein together with control policies. In some examples, the control policy can be formulated to achieve the effect of a caution reaction or a stop reaction for the autonomous vehicle 602. As an example of a caution reaction, the control policy can require the autonomous vehicle 602 to slow down when the autonomous vehicle 602 is within the threshold distance to the crosswalk 604 through which an object has an intent to cross the road. As an example of a stop reaction, the control policy can require the autonomous vehicle 602 to stop completely before the crosswalk 604 if there is a prediction that the autonomous vehicle 602 is likely to interact with or impact the object in the crosswalk 604.

Figure 7:
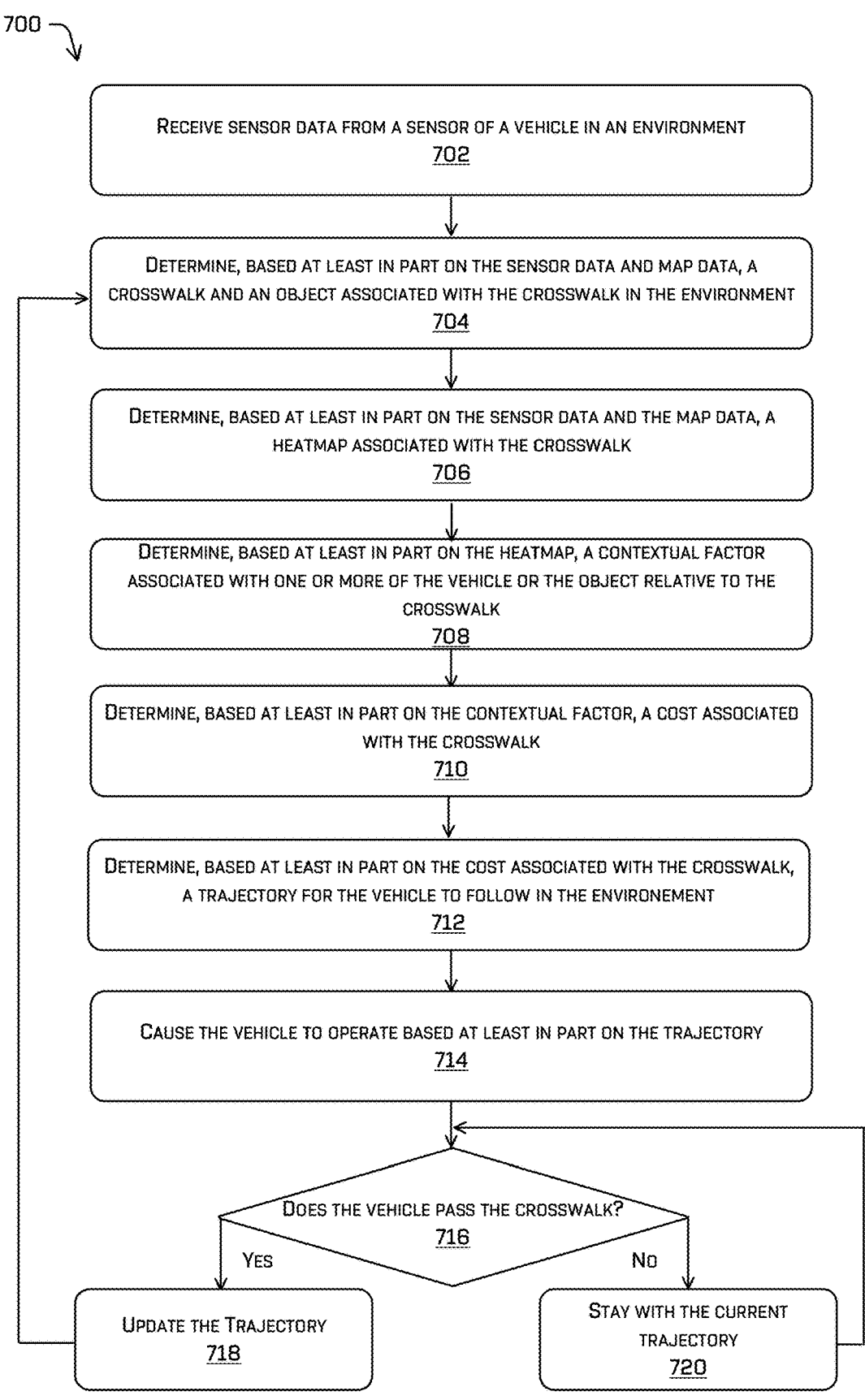
FIG. 7 illustrates an example process for controlling an autonomous vehicle to address a crosswalk with an object in an environment in which the autonomous vehicle operates.

FIG. 7 illustrates an example process 700 for controlling an autonomous vehicle to address a crosswalk with an object in an environment in which the autonomous vehicle operates. The vehicle may include an autonomous or semi-autonomous vehicle. In some instances, the autonomous vehicle may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle may be a fully or partially autonomous vehicle having any other level or classification.

The operations in the process 700 may be used in combination, separately, and/or performed by the same device or different devices. For example, the operations can be implemented by a computing device of an autonomous vehicle and/or a remote computing device (e.g., of a distributed computing service, or of a teleoperations system). Hardware and/or software components of a vehicle computing system may be configured to accomplish at least part of the example process 700. In some examples, at least some of the operations of the processes may be precomputed by the autonomous vehicle and/or other computing device(s), such as a distributed computing system.

At 702, operations can include receiving sensor data from a sensor of a vehicle in an environment. In some instances, autonomous vehicles can be equipped with sensors including but not limited to lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc.

At 704, operations can include determining, based at least in part on the sensor data and map data, a crosswalk, and an object associated with the crosswalk in the environment. In some examples, the object can include a pedestrian, a cyclist, a wheeled pedestrian, a pedestrian with a stroller, or the like.

In some instances, the crosswalk can be entering crosswalks and exiting crosswalks, crossable crosswalks and non-crossable crosswalks, controlled crosswalks and uncontrolled crosswalks, protected crosswalks and unprotected crosswalks, etc. In some instances, the crosswalk can locate in a junction, an intersection, or a roundabout. Alternatively, the crosswalk can locate in the middle of the road without being associated with any junctions or intersections. In some examples, the crosswalk can be associated with or without traffic signals and/or traffic signs. In some examples, the crosswalk can be marked in the map data. Alternatively, the crosswalk can be unmarked in the map data and can be detected based on the sensor data. The map data can be stored in a storage in the computing system of the vehicle, an online storage, storage on another vehicle, storage of a remote computing system, or the like.

At 706, operations can include determining, based at least in part on the sensor data and the map data, a heatmap associated with the crosswalk. In some instances, the planning component of the vehicle can generate a heatmap based on the sensor data, the map data, the perception data, the prediction data, or the like. As described herein, there can be various types of heatmaps, such as the green surface heatmap, the oncoming surface distance heatmap, the crosswalk distance heatmap, etc. In some instances, different types of heatmaps can be used in combination. Of course, such names (e.g, green surface) are merely used to differentiate between the different types for explanatory purposes and are not meant to imply any limitation on the type of heatmaps that are contemplated.

In some instances, the heatmap can be calculated once, and can be reused when the state of the object and/or the state of the vehicle changes over time. For example, as shown in FIG. 4, the heatmap can be calculated once for all the crosswalks in the junction. The planning component of the computing system of the vehicle can calculate a cost associated with the different crosswalks in the junction as the vehicle passes through different crosswalks based on the same heatmap. As such, the heatmap allows the vehicle to explore the entire space quickly and efficiently in the optimization scheme.

At 708, operations can include determining, based at least in part on the heatmap, a contextual factor associated with one or more of the vehicle or the object relative to the crosswalk. In some examples, the contextual factors associated with the crosswalk can include the velocity of the autonomous vehicle (Factor 1), a first distance of the autonomous vehicle to a first boundary of the crosswalk (Factor 2), a second distance of the object to a second boundary of the crosswalk in a current lane for the vehicle to operate (Factor 3), a third distance of the object to a third boundary of the crosswalk in a related lane (Factor 4), or the like.

At 710, operations can include determining, based at least in part on the contextual factors associated with the crosswalk, a cost associated with the crosswalk. In some examples, the cost can be a function (e.g., the multiplication) of the weights of the above four factors (Factor 1, Factor 2, Factor 3, and Factor 4). Note that these factors are exemplary rather than limiting. Such factors are optional and can be replaced by other factors. Moreover, additional factors can be used to determine the cost associated with the crosswalk. In some instances, the cost can be further determined based on other factors such as the type and/or characteristics of the object. For example, different types of objects (e.g., a pedestrian, a bicycle, a pedestrian with a baby stroller, a wheeled pedestrian, a pedestrian with a shopping cart, etc.) can have different costs. In some instances, the cost calculation can be further based on the moving direction of the object. For example, an object moving toward the autonomous vehicle can have a higher cost, while an object moving away from the autonomous vehicle can have a lower cost.

In some examples, there can be an additional step of determining the state of the crosswalk. For example, the planning component of the computing system of the vehicle can determine that the crosswalk is in an unprotected state, and then determine the cost associated with the unprotected crosswalk based on equations and/or methods described throughout this disclosure. As another example, the planning component of the computing system of the vehicle can determine that the crosswalk is in a protected state, and determine that the cost of the protected crosswalk is zero.

In some instances, there can be multiple crosswalks in an injunction of the trajectory of the vehicle. The planning component of the computing system of the vehicle can determine that a first crosswalk is an entering crosswalk, and determine a first cost associated with the entering crosswalk based on equations and/or methods described throughout this disclosure. On the other hand, the planning component of the computing system of the vehicle can determine that a second crosswalk is an exiting crosswalk, and determine a second cost associated with the entering crosswalk based on equations and/or methods described throughout this disclosure. Moreover, the planning component of the computing system of the vehicle can determine a total cost associated with the junction on the trajectory of the vehicle based on the first cost and the second cost. For example, the total cost can be a sum of the first cost and the second cost.

In some instances, after the vehicle passes the entering crosswalk, the cost of the entering crosswalk can be determined to be zero, because the status of the entering crosswalk no longer affects the operation of the vehicle.

At 712, operations can include determining a trajectory for the vehicle to follow in the environment, based at least in part on the cost associated with the crosswalk. In some instances, the trajectory can include an action for the vehicle to take. The action can include a slowing down action, a yielding action, a stopping action, or the like. In some examples, the action can include information regarding a desired deceleration of the vehicle, a desired vehicle velocity, a desired stopping position of the vehicle, or the like.

In some examples, the vehicle may plan the trajectory by conducting a tree search based on costs. The computing system of the vehicle may perform the tree search to choose a trajectory for the vehicle from a set of candidate trajectories at each time tick to execute based on costs determined for candidate trajectories.

At 714, operations can include causing the vehicle to operate based at least in part on the trajectory. In some examples, the controller(s) of the vehicle may receive the trajectory from the planning component of the vehicle and control the vehicle to follow the trajectory in the environment.

At 716, operations can include determining whether the vehicle passes through the crosswalk. If yes, the process 700 proceeds to 718. If no, the process 700 proceeds to 720. As described herein, the vehicle may evaluate at discrete timesteps or points along the trajectory of the vehicle in the environment. Such evaluation may include updating, but is not limited to, a location of the crosswalk, a location of the vehicle, a location of the object, a state of the crosswalk, a state of the vehicle, a state of the object, a moving direction of the object, a distance of the vehicle to one or more crosswalks, a distance of the object to a boundary of the crosswalk, a distance of the vehicle to the object, a state of the traffic signal, a presence of a traffic sign, etc.

At 718, operations can include updating the trajectory. Then, the process 700 can go back 704 to repeated operations of 704-720. In some examples, the prediction component of the computing system of the vehicle can predict a future vehicle state and a future object state. The planning component of the computing system of the vehicle can determine an additional cost associated with the crosswalk based at least in part on one or more of the future vehicle state or the future object state. The planning component of the computing system of the vehicle can adjust the trajectory based on the additional cost.

At 720, operations can include staying with the current trajectory. For example, when the object in the crosswalk is stationary without moving, or blocking the trajectory of the vehicle, the vehicle can hold a yield action for a period of time before moving forward with a relatively low velocity. Then, the process 700 can go back to 716 and repeat operations of 716-720.

Figure 8:
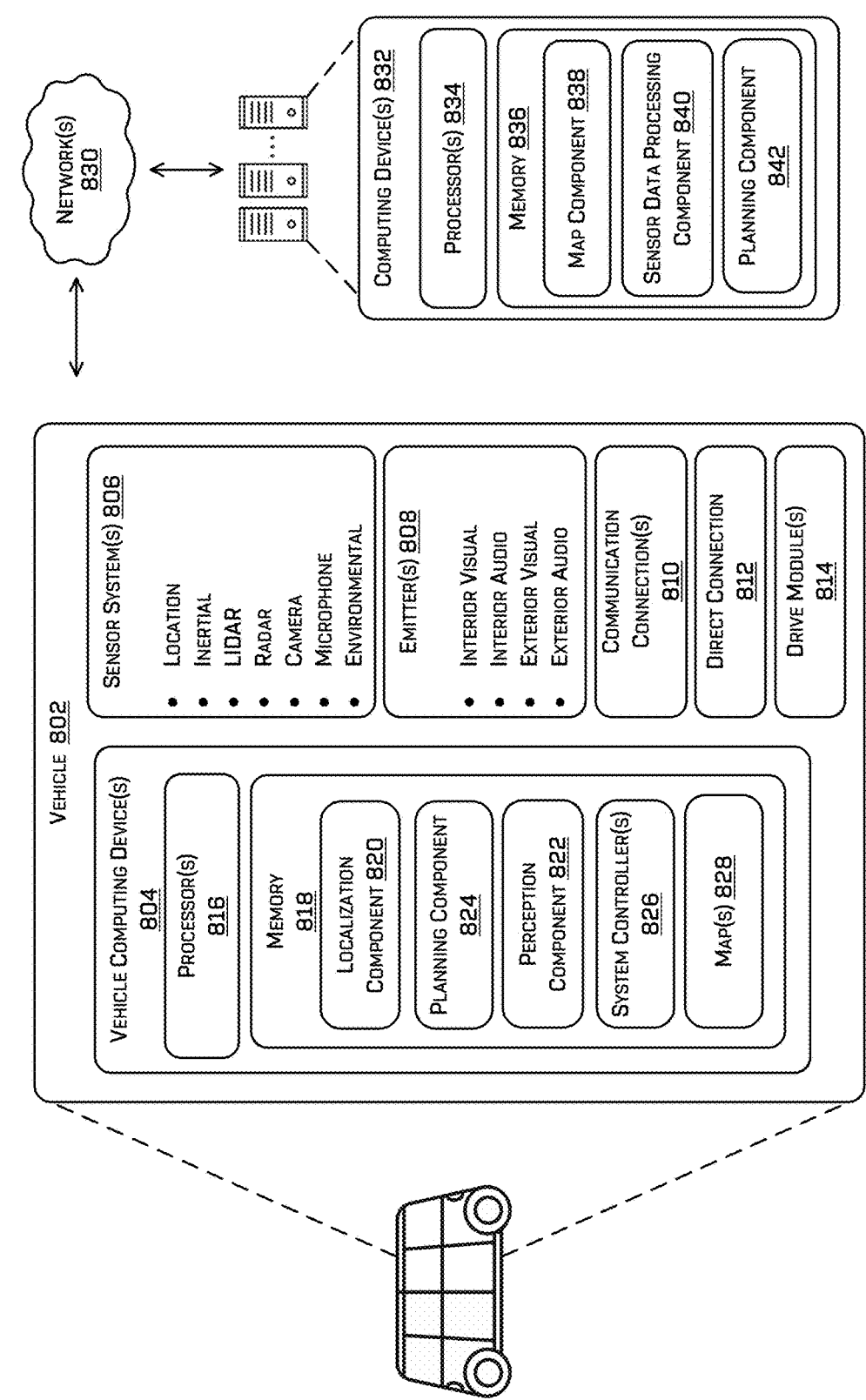
FIG. 8 is a block diagram of an example system for implementing the techniques described herein.

FIG. 8 is a block diagram of an example system 800 for implementing the techniques described herein. In at least one example, the system 800 may include a vehicle 802, such as the vehicle 102.

The vehicle 802 may include a vehicle computing device(s) 804, one or more sensor systems 806, emitter(s) 808, one or more communication connections 810, at least one direct connection 812, and one or more drive modules 814.

The vehicle computing device(s) 804 may include one or more processors 816 and memory 818 communicatively coupled with the processor(s) 816. In the illustrated example, the vehicle 802 is an autonomous vehicle; however, the vehicle 802 could be any other type of vehicle, such as a semi-autonomous vehicle, or any other system having at least an image capture device (e.g., a camera enabled smartphone). In the illustrated example, the memory 818 of the vehicle computing device(s) 804 stores a localization component 820, a perception component 822, a planning component 824, one or more system controllers 826, and one or more maps 828. Though depicted in FIG. 8 as residing in the memory 818 for illustrative purposes, it is contemplated that the localization component 820, the perception component 822, the planning component 824, the system controller(s) 826, the map(s) 828, may additionally, or alternatively, be accessible to the vehicle 802 (e.g., stored on, or otherwise accessible by, memory remote from the vehicle 802, such as, for example, on memory 836 of a remote computing device(s) 832.

In at least one example, the localization component 820 may include functionality to receive data from the sensor system(s) 806 to determine a position and/or orientation of the vehicle 802 (e.g., one or more of an x-, y-, z-position, roll, pitch, or yaw). For example, the localization component 820 may include and/or request/receive a map of an environment and may continuously determine a location and/or orientation of the autonomous vehicle within the map. In some instances, the localization component 820 may utilize SLAM (simultaneous localization and mapping), CLAMS (calibration, localization, and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 820 may provide data to various components of the vehicle 802 to determine an initial position of an autonomous vehicle for generating a path polygon associated with the vehicle path, as discussed herein.

In some instances, the perception component 822 may include functionality to perform object detection, segmentation, and/or classification. In some examples, the perception component 822 may provide processed sensor data that indicates a presence of an object (e.g., entity) that is proximate to the vehicle 802 and/or an object classification as an object type (e.g., car, pedestrian, cyclist, animal, building, tree, road surface, curb, sidewalk, unknown, etc.). In some examples, the perception component 822 may provide processed sensor data that indicates a presence of a stationary entity that is proximate to the vehicle 802 and/or a classification of the stationary entity as a type (e.g., building, tree, road surface, curb, sidewalk, unknown, etc.). In additional or alternative examples, the perception component 822 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment may include, but are not limited to, the presence of another object in the environment, a state of another object in the environment, a time of day, a day of a week, a season, a weather condition, an indication of darkness/light, etc.

In general, the planning component 824 may determine a trajectory for the vehicle 802 to follow to traverse through an environment. For example, the planning component 824 may determine various candidate trajectories and various levels of detail. For example, the planning component 824 may determine a route to travel from a first location (e.g., a current location) to a second location (e.g., a target location). For the purpose of this discussion, a route may include a sequence of waypoints for traveling between two locations. As non-limiting examples, waypoints include streets, intersections, global positioning system (GPS) coordinates, etc. Further, the planning component 824 may generate an instruction for guiding the autonomous vehicle along at least a portion of the route from the first location to the second location. In at least one example, the planning component 824 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 802 to navigate.

In some instances, the planning component 824 may identify a crosswalk and an object associated with the crosswalk in the environment. The planning component 824 may determine a heatmap associated with the crosswalk based on sensor data and map data. The vehicle may determine contextual factors associated with the crosswalk relative to one or more of the vehicle and/or object based on the heatmap associated with the crosswalk. The vehicle may determine a cost associated with the crosswalk based on the factor. The vehicle may determine a trajectory for the vehicle to operate in the environment based on the cost associated with the crosswalk and follow the trajectory to travel in the environment.

In some examples, the contextual factors associated with the crosswalk can include a velocity of the autonomous vehicle (Factor 1), a first distance of the vehicle 802 to the crosswalk (Factor 2), a second distance of the object to a second boundary of the crosswalk in a current lane for the vehicle 802 to operate (Factor 3), a third distance of the object to a third boundary of the crosswalk in a related lane (Factor 4), or the like. In some examples, the cost can be the multiplication of the above four factors (Factor 1, Factor 2, Factor 3, and Factor 4). Note that these factors are exemplary rather than limiting. Such factors are optional and can be replaced by other factors. Moreover, additional factors can be used to determine the cost associated with the crosswalk.

In some instances, the cost can be further determined based on other factors such as the type and/or characteristics of the object. For example, different types of objects (e.g., a pedestrian, a bicycle, a pedestrian with a baby stroller, a wheeled pedestrian, a pedestrian with a shopping cart, etc.) can have different costs. In some instances, the cost calculation can be further based on the moving direction of the object. For example, an object moving toward the vehicle 802 can have a higher cost, while an object moving away from the vehicle 802 can have a lower cost.

In some examples, the vehicle computing device(s) 804 may include a prediction component to generate predicted trajectories of objects (e.g., agents) in an environment. For example, a prediction component may generate one or more predicted trajectories for agents within a threshold distance from the vehicle 802. In some examples, a prediction component may measure a trace of an object and generate a trajectory for the object based on observed and predicted behavior. In some examples, the prediction component can predict a future vehicle state and a future object state.

In at least one example, the vehicle computing device(s) 804 may include the system controller(s) 826, which may be configured to control steering, propulsion, braking, safety, emitters, communication, and other systems of the vehicle 802. The system controller(s) 826 may communicate with and/or control corresponding systems of the drive module(s) 814 and/or other components of the vehicle 802.

The memory 818 may further include the map(s) 828 that may be used by the vehicle 802 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retro-reflectivity information, BRDF information, BSSRDF information, and the like). In one example, a map may include a three-dimensional mesh of the environment. In some examples, the vehicle 802 may be controlled based at least in part on the map(s) 828. That is, the map(s) 828 may be used in connection with the localization component 820, the perception component 822, and/or the planning component 824 to determine a location of the vehicle 802, detect objects in an environment, and/or generate routes and/or trajectories to navigate within an environment.

In some examples, the map(s) 828 may be stored on a remote computing device(s)(such as the computing device(s)832) accessible via network(s) 830. In some examples, multiple maps 828 may be stored based on, for example, a characteristic (e.g., type of entity, time of day, day of week, season of the year, etc.). Storing multiple maps 828 may have similar memory requirements, but increase the speed at which data in a map may be accessed.

As can be understood, the components discussed herein (e.g., the localization component 820, the perception component 822, the planning component 824, the system controller(s) 826, the one or more maps 828, are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory 818 (and the memory 836, discussed below) may be implemented as a neural network.

As described herein, an exemplary neural network is a biologically inspired technique that passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet70, ResNet101, VGG, DenseNet, PointNet, and the like.

In at least one example, the sensor system(s) 806 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 806 may include multiple instances of each of these or other types of sensors. For instance, the LIDAR sensors may include individual LIDAR sensors located at the corners, front, back, sides, and/or top of the vehicle 802. As another example, the camera sensors may include multiple cameras disposed at various locations about the exterior and/or interior of the vehicle 802. The sensor system(s) 806 may provide input to the vehicle computing device(s) 804. Additionally or alternatively, the sensor system(s) 806 may send sensor data, via the one or more networks 830, to the one or more computing device(s) 832 at a designated frequency, after a lapse of a predetermined period of time, in near real-time, etc.

The vehicle 802 may also include emitter(s) 808 for emitting light and/or sound, as described above. The emitter(s) 808 in this example include interior audio and visual emitters to communicate with passengers of the vehicle 802. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 808 in this example also include exterior emitters. By way of example and not limitation, the exterior emitters in this example include lights to signal a direction of travel or other indicators of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 802 may also include one or more communication connection(s) 810 that enables communication between the vehicle 802 and one or more other local or remote computing device(s). For instance, the communication connection(s) 810 may facilitate communication with other local computing device(s) on the vehicle 802 and/or the drive module(s) 814. Also, the communication connection(s) 810 may allow the vehicle to communicate with other nearby computing device(s) (e.g., computing device(s) 832, other nearby vehicles, etc.).

The communications connection(s) 810 may include physical and/or logical interfaces for connecting the vehicle computing device(s) 804 to another computing device or a network, such as network(s) 830. For example, the communications connection(s) 810 can enable Wi-Fi-based communication such as via frequencies defined by the IEEE 802.11 standards, short range wireless frequencies such as Bluetooth, cellular communication (e.g., 2G, 3G, 4G, 4G LTE, 6G, etc.) or any suitable wired or wireless communications protocol that enables the respective computing device to interface with the other computing device(s).

In at least one example, the vehicle 802 may include drive module(s) 814. In some examples, the vehicle 802 may have a single drive module 814. In at least one example, if the vehicle 802 has multiple drive modules 814, individual drive modules 814 may be positioned on opposite ends of the vehicle 802 (e.g., the front and the rear, etc.). In at least one example, the drive module(s) 814 may include one or more sensor systems to detect conditions of the drive module(s) 814 and/or the surroundings of the vehicle 802. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 814. In some cases, the sensor system(s) on the drive module(s) 814 may overlap or supplement corresponding systems of the vehicle 802 (e.g., sensor system(s) 806).

The drive module(s) 814 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 814 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive module(s) 814. Furthermore, the drive module(s) 814 may also include one or more communication connection(s) that enable communication by the respective drive module with one or more other local or remote computing device(s).

In at least one example, the direct connection 812 may provide a physical interface to couple the one or more drive module(s) 814 with the body of the vehicle 802. For example, the direct connection 812 may allow the transfer of energy, fluids, air, data, etc. between the drive module(s) 814 and the vehicle. In some instances, the direct connection 812 may further releasably secure the drive module(s) 814 to the body of the vehicle 802.

In at least one example, the localization component 820, the perception component 822, the planning component 824, the system controller(s) 826, and the map(s) 828 and various components thereof, may process sensor data, as described above, and may send their respective outputs, over the one or more network(s) 830, to the computing device(s) 832. In at least one example, the localization component 820, the perception component 822, the planning component 824, and the system controller(s) 826, the map(s) 828, may send their respective outputs to the computing device(s) 832 at a designated frequency, after a lapse of a predetermined period of time, in near real-time, etc.

In some examples, the vehicle 802 may send sensor data to the computing device(s) 832 via the network(s) 830. In some examples, the vehicle 802 may receive sensor data from the computing device(s) 832 via the network(s) 830. The sensor data may include raw sensor data and/or processed sensor data and/or representations of sensor data. In some examples, the sensor data (raw or processed) may be sent and/or received as one or more log files.

The computing device(s) 832 may include processor(s) 834 and the memory 836 storing a map component 838 and a sensor data processing component 840. In some examples, the map component 838 may include functionality to generate maps of various resolutions. In such examples, the map component 838 may send one or more maps to the vehicle computing device(s) 804 for navigational purposes. In various examples, the sensor data processing component 840 may be configured to receive data from one or more remote sensors, such as sensor systems 806. In some examples, the sensor data processing component 840 may be configured to receive the sensor data from the vehicle 802 and process the sensor data such as for use by the planning component 842.

The processor(s) 816 of the vehicle 802 and the processor(s) 834 of the computing device(s) 832 may be any suitable processor capable of executing instructions to process data and perform operations as described herein. By way of example and not limitation, the processor(s) 816 and the processor(s) 834 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 818 and memory 836 are examples of non-transitory computer-readable media. The memory 818 and memory 836 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 818 and memory 836 may include at least a working memory and a storage memory. For example, the working memory may be a high-speed memory of limited capacity (e.g., cache memory) that is used for storing data to be operated on by the processor(s) 816 and processor(s) 834. In some instances, the memory 818 and memory 836 may include a storage memory that may be a lower-speed memory of relatively large capacity that is used for long-term storage of data. In some cases, the processor(s) 816 and processor(s) 834 cannot operate directly on data that is stored in the storage memory, and data may need to be loaded into a working memory for performing operations based on the data, as discussed herein.

It should be noted that while FIG. 8 is illustrated as a distributed system, in alternative examples, components of the vehicle 802 may be associated with the computing device(s) 832, and/or components of the computing device(s) 832 may be associated with the vehicle 802. That is, the vehicle 802 may perform one or more of the functions associated with the computing device(s) 832, and vice versa.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

A: An autonomous vehicle, comprising: one or more processors; and one or more non-transitory computer-readable media storing instructions that, when executed by the one or more processors, cause the one or more processors to perform operations comprising: receiving sensor data from a sensor of the autonomous vehicle in an environment; determining, based at least in part on the sensor data and map data, a location of a crosswalk and an object within a threshold distance to the crosswalk; determining, based at least in part on the sensor data and the map data, a heatmap associated with the crosswalk, the heatmap comprising a plurality of cells discretized over a portion of the environment, an individual cell indicating a metric associated with the one or more of the autonomous vehicle or the object relative to the crosswalk; determining, based at least in part on the heatmap, a contextual factor associated with the one or more of the autonomous vehicle or the object relative to the crosswalk; determining, based at least in part on the contextual factor, a cost associated with the crosswalk; determining, based at least in part on the cost associated with the crosswalk, a trajectory for the autonomous vehicle; and causing the autonomous vehicle to operate based at least in part on the trajectory.

B: The autonomous vehicle of paragraph A, wherein the cost is further based at least in part on at least one of: a velocity of the autonomous vehicle, a state of the crosswalk, or a type of the crosswalk. a crosswalk state, a crosswalk classification, an object classification, an object state, a moving direction of the object, or a traffic signal state.

C: The autonomous vehicle of either paragraph A or B, wherein the metric indicated by the individual cell of the plurality of cells of the heatmap associated with the crosswalk comprises at least one of: a first distance from the individual cell to a first boundary of the crosswalk; a second distance of the object to a second boundary of the crosswalk in a current lane for the autonomous vehicle to operate; or a third distance of the object to a third boundary of the crosswalk in a related lane.

D: The autonomous vehicle of paragraph C, wherein the contextual factor comprises at least one of: a velocity weight associated with a velocity of the autonomous vehicle, a first weight of the first distance of the autonomous vehicle to the first boundary of the crosswalk, a second weight of the second distance of the object to the second boundary of the crosswalk in the current lane for the autonomous vehicle to operate, or a third weight of the third distance of the object to the third boundary of the crosswalk in the related lane, and wherein determining the cost comprises determining a product of the contextual factors.

E: The autonomous vehicle of any one of paragraphs A-D, wherein determining, based at least in part on the cost associated with the crosswalk, the trajectory for the autonomous vehicle comprises at least one of: determining, based at least in part on the cost associated with the crosswalk, a slowing down action; determining, based at least in part on the cost associated with the crosswalk, a yielding action; or determining, based at least in part on the cost associated with the crosswalk, a stopping action.

F: A method comprising: receiving sensor data from a sensor of a vehicle in an environment; determining, based at least in part on the sensor data and map data, an object associated with a crosswalk; determining, based at least in part on the sensor data and the map data, a heatmap associated with the crosswalk, the heatmap comprising a plurality of cells discretized over a portion of the environment; determining, based at least in part on the heatmap, a factor associated with one or more of the vehicle or the object relative to the crosswalk; determining, based at least in part on the factor, a cost associated with the crosswalk; determining a trajectory for the vehicle to follow in the environment, based at least in part on the cost associated with the crosswalk; and causing the vehicle to operate based at least in part on the trajectory.

G: The method of paragraph F, wherein the factor associated with the crosswalk comprises at least one of: a vehicle velocity, a first distance of the vehicle to a first boundary of the crosswalk, a second distance of the object to a second boundary of the crosswalk in a current lane for the vehicle to operate, or a third distance of the object to a third boundary of the crosswalk in a related lane.

H: The method of paragraph G, wherein the cost is further based at least in part on one or more of: a crosswalk state, a crosswalk classification, an object classification, an object state, a moving direction of the object, or a traffic signal state.

I: The method of paragraph H, wherein the object classification comprises at least one of a pedestrian, a cyclist, or a wheeled pedestrian.

J: The method of any one of paragraphs G-I, wherein determining, based at least in part on the factor, the cost associated with the crosswalk further comprises: determining that the crosswalk is in an unprotected state; and determining the cost based at least in part on the factor upon determining that the crosswalk is in the unprotected state.

K: The method of any one of paragraphs G-J, wherein determining, based at least in part on the factor, the cost associated with the crosswalk further comprises: determining that the crosswalk is in a protected state; and determining the cost to be zero upon determining that the crosswalk is in the protected state.

L: The method of any one of paragraphs F-K, further comprising: determining, based at least in part on the sensor data and the map data, a first crosswalk to be an entering crosswalk in a junction on the trajectory of the vehicle; determining a first cost associated with the entering crosswalk; determining, based at least in part of the sensor data and the map data, a second crosswalk to be an exiting crosswalk in the junction on the trajectory of the vehicle; determining a second cost associated with the exiting crosswalk; and determining a total cost based at least in part on the first cost and the second cost.

M: The method of any one of paragraphs F-L, wherein an individual cell of the plurality of cells of the heatmap associated with the crosswalk comprises at least one of: a first distance from the individual cell to a first boundary of the crosswalk; a second distance of the object to a second boundary of the crosswalk in a current lane for the vehicle to operate; or a third distance of the object to a third boundary of the crosswalk in a related lane.

N: The method of paragraph M, wherein the factor comprises at least one of: a velocity weight associated with a velocity of the vehicle, a first weight associated with the first distance of the vehicle to the first boundary of the crosswalk, a second weight associated with the second distance of the object to the second boundary of the crosswalk in the current lane for the vehicle to operate, or a third weight associated with the third distance of the object to the third boundary of the crosswalk in the related lane.

O: The method of any one of paragraphs F-N, wherein determining, based at least in part on the cost associated with the crosswalk, the trajectory for the vehicle comprises at least one of: determining, based at least in part on the cost associated with the crosswalk, a slowing down action; determining, based at least in part on the cost associated with the crosswalk, a yielding action; or determining, based at least in part on the cost associated with the crosswalk, a stopping action.

P: The method of any one of paragraphs F-O, further comprising: predicting a future vehicle state and a future object state; and determining an additional cost associated with the crosswalk based at least in part on one or more of the future vehicle state or the future object state, wherein determining the trajectory is further based at least in part on the additional cost.

Q: A non-transitory computer-readable medium storing processor-executable instructions that, when executed by one or more processors, cause the one or more processors to perform operations comprising: receiving sensor data from a sensor of a vehicle in an environment; determining, based at least in part on the sensor data and map data, an object associated with a crosswalk; determining factor associated with one or more of the vehicle or the object relative to the crosswalk; determining, based at least in part on the factor, a cost associated with the crosswalk; determining a trajectory for the vehicle to follow in the environment, based at least in part on the cost associated with the crosswalk; and causing the vehicle to operate based at least in part on the trajectory.

R: The non-transitory computer-readable medium of paragraph Q, wherein the factor associated with the crosswalk comprises at least one of: a vehicle velocity, a first distance of the vehicle to a first boundary of the crosswalk, a second distance of the object to a second boundary of the crosswalk in a current lane for the vehicle to operate, or a third distance of the object to a third boundary of the crosswalk in a related lane.

S: The non-transitory computer-readable medium of paragraph R, wherein the factor associated with the crosswalk comprises at least one of: a velocity weight associated with a velocity of the vehicle, a first weight associated with a first distance of the vehicle to a first boundary of the crosswalk, a second weight associated with a second distance of the object to a second boundary of the crosswalk in a current lane for the vehicle to operate, or a third weight associated with a third distance of the object to a third boundary of the crosswalk in a related lane.

T: The non-transitory computer-readable medium of paragraph S, wherein the object comprises at least one of a pedestrian, a cyclist, or a wheeled pedestrian.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements, and/or steps are in any way required for one or more examples or that one or more examples necessarily include logic for deciding, with or without user input or prompting, whether certain features, elements and/or steps are included or are to be performed in any designated example.

Conjunctive languages such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements, or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. An autonomous vehicle, comprising:
one or more processors; and
one or more non-transitory computer-readable media storing instructions that, when executed by the one or more processors, cause the one or more processors to perform operations comprising:
receiving sensor data from a sensor of the autonomous vehicle in an environment;
determining, based at least in part on the sensor data and map data, a location of a crosswalk and an object within a threshold distance to the crosswalk;
determining, based at least in part on the sensor data and the map data, a heatmap associated with the crosswalk, the heatmap comprising a plurality of cells discretized over a portion of the environment, an individual cell indicating a metric associated with the one or more of the autonomous vehicle or the object relative to the crosswalk;
determining, based at least in part on the heatmap, a contextual factor associated with the one or more of the autonomous vehicle or the object relative to the crosswalk;

determining a weight value associated with the autonomous vehicle or the crosswalk;
determining, based at least in part on the contextual factor and the weight value, a cost associated with the crosswalk;
determining, based at least in part on the cost associated with the crosswalk, a trajectory for the autonomous vehicle; and
causing the autonomous vehicle to operate based at least in part on the trajectory.

2. The autonomous vehicle of claim 1, wherein the metric indicated by the individual cell of the plurality of cells of the heatmap associated with the crosswalk comprises at least one of:
a first distance from the individual cell to a first boundary of the crosswalk;
a second distance of the object to a second boundary of the crosswalk in a current lane for the autonomous vehicle to operate; or
a third distance of the object to a third boundary of the crosswalk in a related lane.

3. The autonomous vehicle of claim 2, wherein the contextual factor comprises at least one of:
a velocity weight associated with a velocity of the autonomous vehicle,
a first weight of the first distance of the autonomous vehicle to the first boundary of the crosswalk,
a second weight of the second distance of the object to the second boundary of the crosswalk in the current lane for the autonomous vehicle to operate, or
a third weight of the third distance of the object to the third boundary of the crosswalk in the related lane,
wherein determining the cost comprises determining a product of the velocity weight, the first weight, the second weight, and the third weight.

4. The autonomous vehicle of claim 1, wherein determining, based at least in part on the cost associated with the crosswalk, the trajectory for the autonomous vehicle comprises at least one of:
determining, based at least in part on the cost associated with the crosswalk, a slowing down action;
determining, based at least in part on the cost associated with the crosswalk, a yielding action; or
determining, based at least in part on the cost associated with the crosswalk, a stopping action.

5. A method comprising:
receiving sensor data from a sensor of a vehicle in an environment;
determining, based at least in part on the sensor data and map data, an object associated with a crosswalk;
determining, based at least in part on the sensor data and the map data, a heatmap associated with the crosswalk, the heatmap comprising a plurality of cells discretized over a portion of the environment;
determining, based at least in part on the heatmap, a factor associated with one or more of the vehicle or the object relative to the crosswalk;
determining a weight value associated with the vehicle or the crosswalk;
determining, based at least in part on the factor and the weight value, a cost associated with the crosswalk;
determining a trajectory for the vehicle to follow in the environment, based at least in part on the cost associated with the crosswalk; and
causing the vehicle to operate based at least in part on the trajectory.

6. The method of claim 5, wherein the factor associated with the crosswalk comprises at least one of:

a vehicle velocity, a first distance of the vehicle to a first boundary of the crosswalk, a second distance of the object to a second boundary of the crosswalk in a current lane for the vehicle to operate, or a third distance of the object to a third boundary of the crosswalk in a related lane.

7. The method of claim 6, wherein the cost is further based at least in part on one or more of:

a crosswalk state, a crosswalk classification, an object classification, an object state, a moving direction of the object, or a traffic signal state.

8. The method of claim 6, wherein determining, based at least in part on the factor, the cost associated with the crosswalk further comprises:

determining that the crosswalk is in an unprotected state; and determining the cost based at least in part on the factor upon determining that the crosswalk is in the unprotected state.

9. The method of claim 6, wherein determining, based at least in part on the factor, the cost associated with the crosswalk further comprises:

determining that the crosswalk is in a protected state; and determining the cost to be zero upon determining that the crosswalk is in the protected state.

10. The method of claim 5, further comprising:

determining, based at least in part on the sensor data and the map data, a first crosswalk to be an entering crosswalk in a junction on the trajectory of the vehicle;

determining a first cost associated with the entering crosswalk;

determining, based at least in part of the sensor data and the map data, a second crosswalk to be an exiting crosswalk in the junction on the trajectory of the vehicle;

determining a second cost associated with the exiting crosswalk; and determining a total cost based at least in part on the first cost and the second cost.

11. The method of claim 5, wherein an individual cell of the plurality of cells of the heatmap associated with the crosswalk comprises at least one of:

a first distance from the individual cell to a first boundary of the crosswalk;

a second distance of the object to a second boundary of the crosswalk in a current lane for the vehicle to operate; or a third distance of the object to a third boundary of the crosswalk in a related lane.

12. The method of claim 11, wherein the factor comprises at least one of:

a velocity weight associated with a velocity of the vehicle, a first weight associated with the first distance of the vehicle to the first boundary of the crosswalk, a second weight associated with the second distance of the object to the second boundary of the crosswalk in the current lane for the vehicle to operate, or a third weight associated with the third distance of the object to the third boundary of the crosswalk in the related lane.

13. The method of claim 5, wherein determining, based at least in part on the cost associated with the crosswalk, the trajectory for the vehicle comprises at least one of:

determining, based at least in part on the cost associated with the crosswalk, a slowing down action;

determining, based at least in part on the cost associated with the crosswalk, a yielding action; or determining, based at least in part on the cost associated with the crosswalk, a stopping action.

14. The method of claim 5, further comprising:

predicting a future vehicle state and a future object state; and determining an additional cost associated with the crosswalk based at least in part on one or more of the future vehicle state or the future object state, wherein determining the trajectory is further based at least in part on the additional cost.

15. A non-transitory computer-readable medium storing processor-executable instructions that, when executed by one or more processors, cause the one or more processors to perform operations comprising:

receiving sensor data from a sensor of a vehicle in an environment;

determining, based at least in part on the sensor data and map data, an object associated with a crosswalk;

determining factor associated with one or more of the vehicle or the object relative to the crosswalk;

determining a weight value associated with the vehicle or the crosswalk;

determining, based at least in part on the factor and the weight value, a cost associated with the crosswalk;

determining a trajectory for the vehicle to follow in the environment, based at least in part on the cost associated with the crosswalk; and causing the vehicle to operate based at least in part on the trajectory.

16. The non-transitory computer-readable medium of claim 15, wherein the factor associated with the crosswalk comprises at least one of:

a vehicle velocity, a first distance of the vehicle to a first boundary of the crosswalk, a second distance of the object to a second boundary of the crosswalk in a current lane for the vehicle to operate, or a third distance of the object to a third boundary of the crosswalk in a related lane.

17. The non-transitory computer-readable medium of claim 16, wherein the factor associated with the crosswalk comprises at least one of:

a velocity weight associated with a velocity of the vehicle, a first weight associated with a first distance of the vehicle to a first boundary of the crosswalk, a second weight associated with a second distance of the object to a second boundary of the crosswalk in a current lane for the vehicle to operate, or a third weight associated with a third distance of the object to a third boundary of the crosswalk in a related lane.

18. The non-transitory computer-readable medium of claim 17, wherein the object comprises at least one of a pedestrian, a cyclist, or a wheeled pedestrian.

19. The autonomous vehicle of claim 1, wherein the individual cell stores distance data associated with the autonomous vehicle or the object relative to the crosswalk.

20. The autonomous vehicle of claim 1, wherein determining the cost is based at least in part on:

determining a buffer region that is adjacent to the cross-walk; and determining that the object is located within the buffer region, wherein determining the cost is based at least in part on the object being within the buffer region.

* * * * *